(12) United States Patent
Chen et al.

(10) Patent No.: US 9,547,157 B2
(45) Date of Patent: Jan. 17, 2017

(54) OPTICAL IMAGING LENS AND ELECTRONIC DEVICE COMPRISING THE SAME

(71) Applicants: Shih-Han Chen, Taichung (TW); Jia-Sin Jhang, Taichung (TW)

(72) Inventors: Shih-Han Chen, Taichung (TW); Jia-Sin Jhang, Taichung (TW)

(73) Assignee: Genius Electronic Optical Co., Ltd., Taichung (TW)

( * ) Notice: Subject to any disclaimer, the term of this patent is extended or adjusted under 35 U.S.C. 154(b) by 83 days.

(21) Appl. No.: 14/695,054

(22) Filed: Apr. 24, 2015

(65) Prior Publication Data

US 2016/0216480 A1 Jul. 28, 2016

(30) Foreign Application Priority Data

Jan. 23, 2015 (CN) .......................... 2015 1 0035045

(51) Int. Cl.
*G02B 13/00* (2006.01)
*H04N 5/225* (2006.01)
*G02B 9/62* (2006.01)

(52) U.S. Cl.
CPC ........ *G02B 13/0045* (2013.01); *H04N 5/2254* (2013.01)

(58) Field of Classification Search
CPC ....... G02B 13/0045; G02B 9/62; G02B 13/18; G02B 13/00; G02B 13/06; H04N 5/225
USPC ......................................................... 359/713
See application file for complete search history.

(56) References Cited

U.S. PATENT DOCUMENTS

| 2012/0188654 | A1  | 7/2012  | Huang |              |
|--------------|-----|---------|-------|--------------|
| 2013/0342918 | A1  | 12/2013 | Kubota |             |
| 2015/0362702 | A1* | 12/2015 | Tang  | G02B 13/0045 |
|              |     |         |       | 348/335      |
| 2016/0048005 | A1* | 2/2016  | Chen  | G02B 13/0045 |
|              |     |         |       | 348/208.2    |
| 2016/0131872 | A1* | 5/2016  | Tang  | G02B 27/0025 |
|              |     |         |       | 359/713      |
| 2016/0131873 | A1* | 5/2016  | Tang  | G02B 13/0045 |
|              |     |         |       | 359/713      |

FOREIGN PATENT DOCUMENTS

| JP | P20157748 A | 1/2015 |
|----|--------------|--------|
| TW | 201344234    | 11/2013 |

(Continued)

*Primary Examiner* — Bumsuk Won
*Assistant Examiner* — Grant Gagnon
(74) *Attorney, Agent, or Firm* — Winston Hsu; Scott Margo

(57) ABSTRACT

In an optical imaging lens set a first lens of positive refractive power has an object-side surface with a convex portion around the optical axis and a convex portion around its periphery, an image-side surface with a convex portion around its periphery, a second lens of negative refractive power has an object-side surface with a concave portion around its periphery, a third lens has an image-side surface with a concave portion around its periphery, a fourth lens has an image-side surface with a convex portion around the optical axis, a fifth lens has an object-side surface with a concave portion around its periphery, a sixth lens has an image-side surface with a concave portion around the optical axis and a convex portion around its periphery. The sum of total five air gaps AAG and a second lens thickness $T_2$ satisfy $AAG/T_2 \leq 3.6$.

18 Claims, 33 Drawing Sheets

(56) References Cited

FOREIGN PATENT DOCUMENTS

| | | |
|---|---|---|
| TW | 201348734 | 12/2013 |
| TW | 201348734 A | 12/2013 |
| TW | 201418763 | 5/2014 |
| TW | 201508317 | 3/2015 |

* cited by examiner

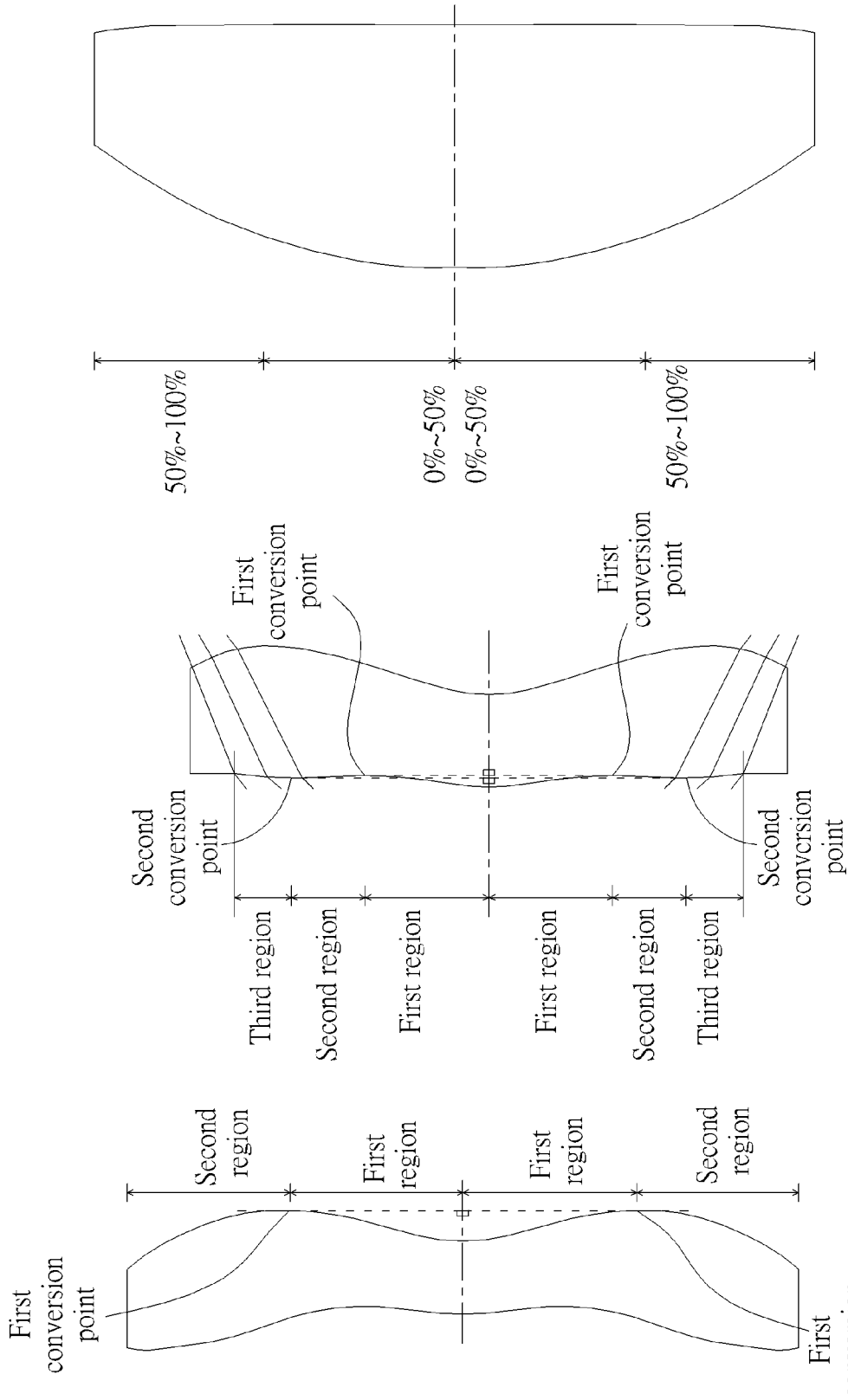

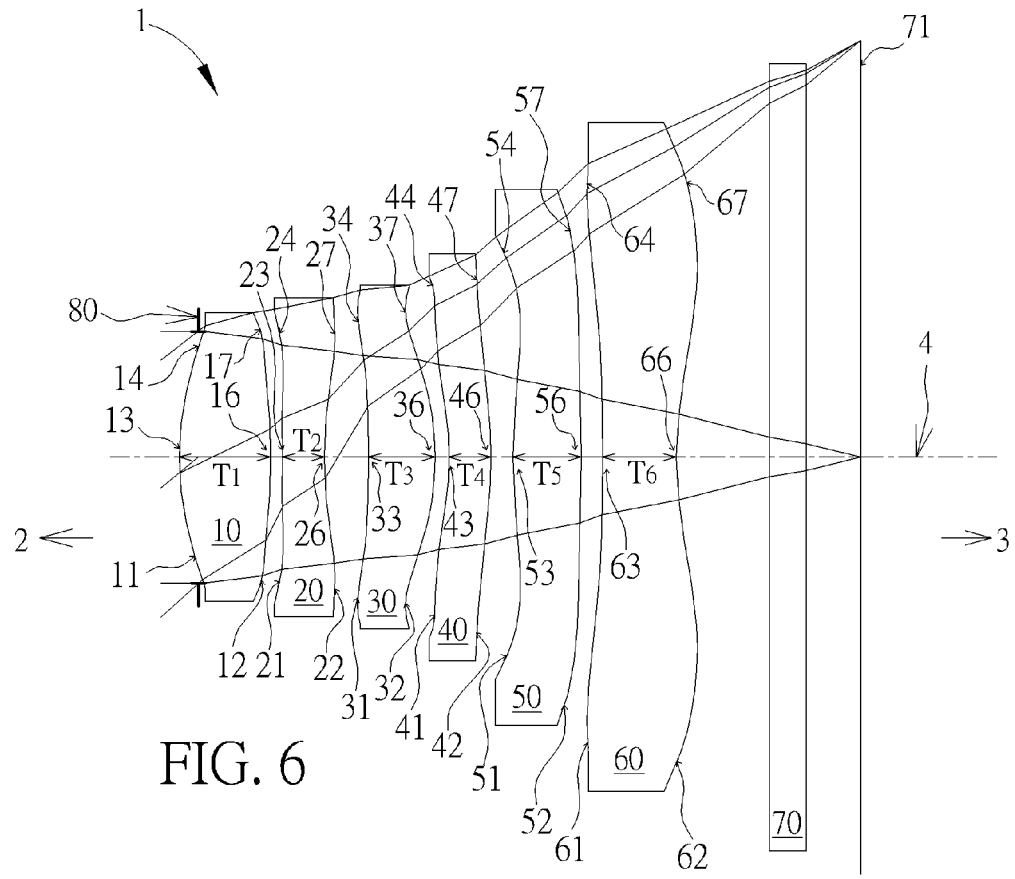
FIG. 6
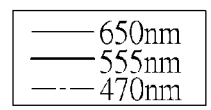
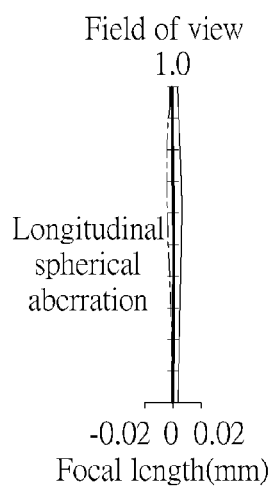
FIG. 7A
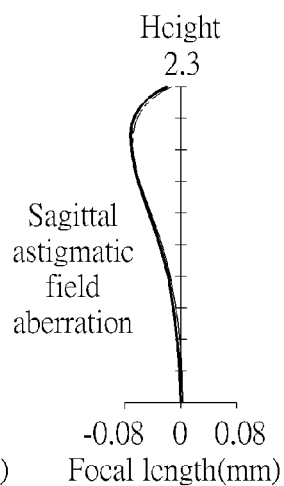
FIG. 7B
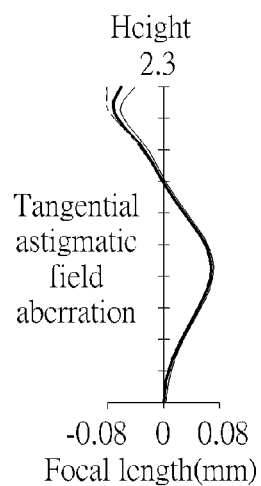
FIG. 7C
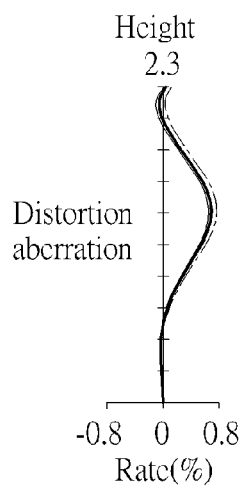
FIG. 7D

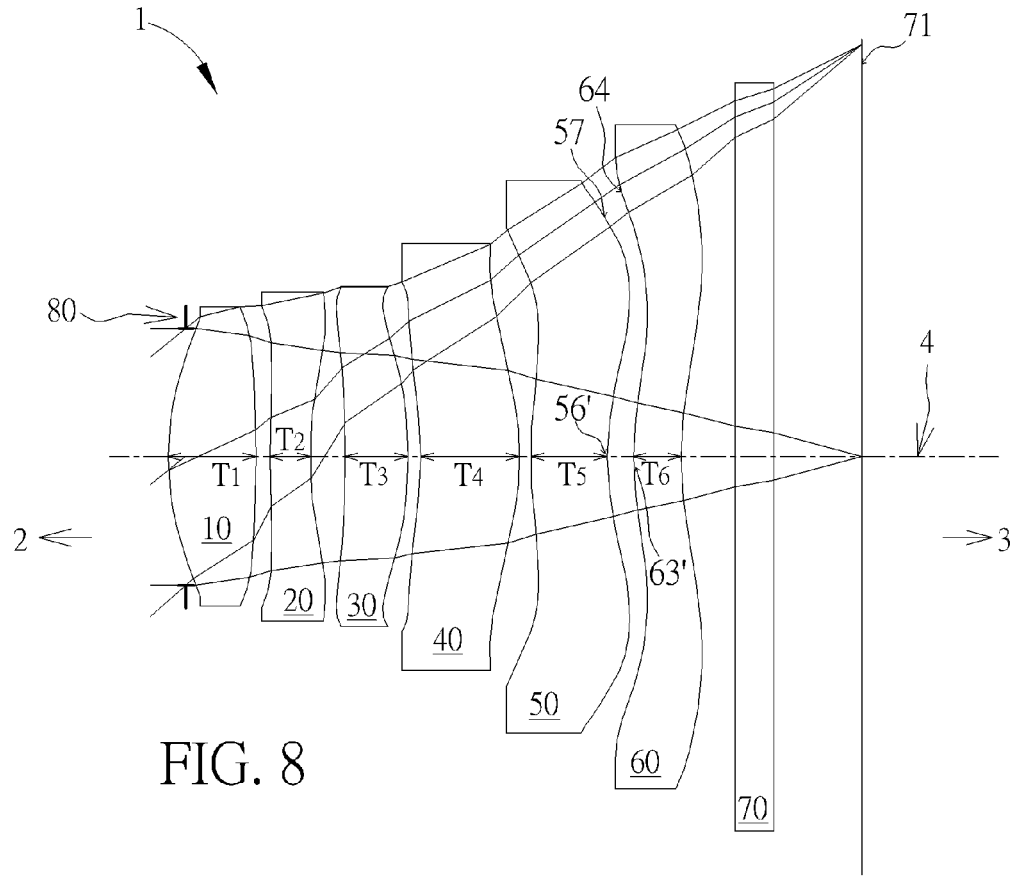
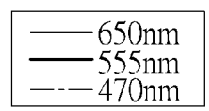
FIG. 8
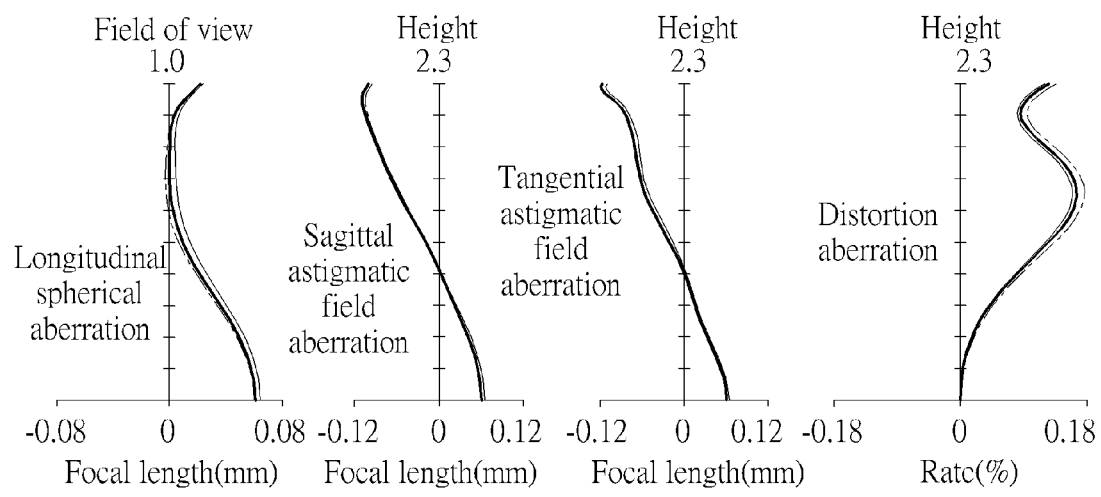
FIG. 9A  FIG. 9B  FIG. 9C  FIG. 9D

— 650nm
— 555nm
--- 470nm

| No. | | Curvature Radius | Ape. Stop Distance Lens Thickness Air Gap | | Refractive Index | Abbe No. | Focal Length |
|---|---|---|---|---|---|---|---|
| | | First Example | | | | | |
| | | F=2.776 mm, HFOV= 39.63 deg., Fno= 2.0 | | | | | |
| | Object | Infinity | Infinity | | | | |
| 80 | Ape. Stop | Infinity | -0.1100 | | | | |
| 11 | First Lens | 1.7748 | 0.5009 | $T_1$ | 1.535 | 55.712 | 2.409 |
| 12 | | -4.2927 | 0.0700 | $G_{12}$ | | | |
| 21 | Second Lens | 17.6884 | 0.2300 | $T_2$ | 1.643 | 22.437 | -3.799 |
| 22 | | 2.1499 | 0.2462 | $G_{23}$ | | | |
| 31 | Third Lens | -12.1691 | 0.3640 | $T_3$ | 1.535 | 55.712 | 2.997 |
| 32 | | -1.4357 | 0.0799 | $G_{34}$ | | | |
| 41 | Fourth Lens | -1.4505 | 0.2300 | $T_4$ | 1.535 | 55.712 | -6.254 |
| 42 | | -2.6952 | 0.1219 | $G_{45}$ | | | |
| 51 | Fifth Lens | 2.9047 | 0.3763 | $T_5$ | 1.535 | 55.712 | 3.926 |
| 52 | | -7.3304 | 0.1184 | $G_{56}$ | | | |
| 61 | Sixth Lens | -12.4261 | 0.4068 | $T_6$ | 1.531 | 55.744 | -3.269 |
| 62 | | 2.0490 | 0.5083 | | | | |
| 70 | IR Filter | Infinity | 0.2100 | | | | |
| | IR Filter-Image Plane | Infinity | 0.2937 | | | | |
| 71 | Image Plane | Infinity | | | | | |

FIG. 26

| No. | 11 | 12 | 21 | 22 | 31 | 32 |
|---|---|---|---|---|---|---|
| K | 0.0000E+00 | 0.0000E+00 | 0.0000E+00 | 0.0000E+00 | 0.0000E+00 | 0.0000E+00 |
| a4 | 2.9935E-03 | 1.6855E-01 | 1.7901E-02 | -2.0480E-01 | -2.9323E-01 | 2.8761E-02 |
| a6 | 4.4711E-02 | -2.9436E-01 | -4.2344E-01 | -8.3546E-03 | 3.5845E-01 | 2.5312E-01 |
| a8 | -3.4144E-01 | -4.3143E-01 | -2.0082E-02 | -2.7985E-01 | -4.3955E-02 | 1.3713E-02 |
| a10 | 4.4763E-01 | 1.0435E+00 | 5.9287E-01 | 3.4026E-01 | 0.0000E+00 | 0.0000E+00 |
| a12 | -3.8603E-01 | -6.8947E-01 | -2.3408E-01 | -3.3130E-02 | 0.0000E+00 | 0.0000E+00 |
| a14 | 0.0000E+00 | 0.0000E+00 | 0.0000E+00 | 0.0000E+00 | 0.0000E+00 | 0.0000E+00 |
| a16 | 0.0000E+00 | 0.0000E+00 | 0.0000E+00 | 0.0000E+00 | 0.0000E+00 | 0.0000E+00 |
| No. | 41 | 42 | 51 | 52 | 61 | 62 |
| K | 0.0000E+00 | -1.6141E+00 | 0.0000E+00 | 0.0000E+00 | 0.0000E+00 | -1.1279E+01 |
| a4 | 5.6788E-01 | 1.8561E-01 | -2.4079E-01 | 1.1182E-01 | -1.4211E-02 | -7.7959E-02 |
| a6 | -1.4130E-01 | -1.9191E-01 | 1.0918E-01 | -9.1087E-02 | 8.6506E-04 | 3.0443E-02 |
| a8 | -4.0277E-01 | 2.6615E-01 | -3.6203E-02 | 2.8357E-02 | 4.0681E-03 | -1.5076E-02 |
| a10 | 4.8680E-01 | -2.3336E-01 | -2.6583E-02 | -7.0098E-03 | -8.9692E-04 | 4.3658E-03 |
| a12 | -2.2253E-01 | 7.5589E-02 | 1.6993E-02 | 1.2604E-03 | 2.7665E-04 | -5.1921E-04 |
| a14 | 0.0000E+00 | 0.0000E+00 | 0.0000E+00 | 0.0000E+00 | -1.1845E-04 | 3.4724E-06 |
| a16 | 0.0000E+00 | 0.0000E+00 | 0.0000E+00 | 0.0000E+00 | 1.5429E-05 | 2.4113E-06 |

FIG. 27

| \multicolumn{6}{|c|}{Second Example} |
|---|---|---|---|---|---|
| \multicolumn{6}{|c|}{F= 2.865 mm, HFOV= 39.05 deg., Fno= 2.0} |
| No. | | Curvature Radius | Ape. Stop Distance Lens Thickness Air Gap | Refractive Index | Abbe No. | Focal Length |
| | Object | Infinity | Infinity | | | |
| 80 | Ape. Stop | Infinity | -0.1000 | | | |
| 11 | First Lens | 1.6650 | 0.4891 $T_1$ | 1.535 | 55.712 | 2.438 |
| 12 | | -5.4894 | 0.0782 $G_{12}$ | | | |
| 21 | Second Lens | 8.8670 | 0.2240 $T_2$ | 1.643 | 22.437 | -3.797 |
| 22 | | 1.9067 | 0.1955 $G_{23}$ | | | |
| 31 | Third Lens | -13.8336 | 0.3520 $T_3$ | 1.535 | 55.712 | 5.269 |
| 32 | | -2.3693 | 0.0699 $G_{34}$ | | | |
| 41 | Fourth Lens | -2.3129 | 0.5518 $T_4$ | 1.535 | 55.712 | 9.243 |
| 42 | | -1.7090 | 0.0639 $G_{45}$ | | | |
| 51 | Fifth Lens | 2.3318 | 0.4238 $T_5$ | 1.535 | 55.712 | -7.907 |
| 52 | | 1.4095 | 0.1528 $G_{56}$ | | | |
| 61 | Sixth Lens | 2.1691 | 0.2644 $T_6$ | 1.531 | 55.744 | -684.563 |
| 62 | | 2.0649 | 0.3000 | | | |
| 70 | IR Filter | Infinity | 0.2100 | | | |
| | IR Filter-Image Plane | Infinity | 0.4869 | | | |
| 71 | Image Plane | Infinity | | | | |

FIG. 28

| No. | 11 | 12 | 21 | 22 | 31 | 32 |
|---|---|---|---|---|---|---|
| K | -1.3359E+01 | -1.3457E+02 | 0.0000E+00 | -2.4495E+01 | 0.0000E+00 | 0.0000E+00 |
| a4 | 3.1700E-01 | 5.6710E-02 | 2.0735E-02 | 2.3591E-01 | -1.1569E-01 | -9.4363E-02 |
| a6 | -4.0800E-01 | -1.6223E-01 | -3.4513E-01 | -6.2714E-01 | -2.6059E-02 | 5.3841E-02 |
| a8 | 3.5468E-01 | -2.2491E-01 | -1.0888E-01 | 2.9297E-01 | 1.4086E-01 | 1.4038E-01 |
| a10 | -2.4118E-01 | 1.6663E-01 | 2.5005E-01 | 1.0305E-01 | 4.9636E-02 | 4.3147E-02 |
| a12 | 1.7919E-01 | 3.4478E-01 | 3.7918E-01 | -1.1174E-01 | 0.0000E+00 | 0.0000E+00 |
| a14 | -3.9648E-01 | 2.2100E-02 | -1.6983E-01 | -1.9512E-01 | 0.0000E+00 | 0.0000E+00 |
| a16 | 1.3980E-01 | -6.5163E-01 | -3.3305E-01 | 2.5100E-01 | 0.0000E+00 | 0.0000E+00 |
| No. | 41 | 42 | 51 | 52 | 61 | 62 |
| K | -4.0406E+01 | -1.5709E+00 | -6.1609E+00 | -5.1696E+00 | 0.0000E+00 | 0.0000E+00 |
| a4 | -5.0883E-02 | 1.5441E-01 | -2.2487E-01 | -1.5312E-01 | -2.1176E-01 | -1.8577E-01 |
| a6 | 2.8907E-01 | -1.1503E-01 | 4.8096E-02 | 2.9689E-02 | 2.5291E-02 | 4.8049E-02 |
| a8 | -3.0868E-01 | 5.7037E-02 | -1.4122E-02 | -1.2948E-02 | 7.3909E-03 | -7.0185E-03 |
| a10 | 2.2771E-01 | 1.3182E-01 | 1.0673E-03 | 2.2973E-03 | -1.4320E-03 | 7.4530E-05 |
| a12 | -1.9070E-01 | -1.3310E-01 | 2.1680E-03 | -8.8955E-05 | 0.0000E+00 | 0.0000E+00 |
| a14 | 7.7417E-02 | 1.2593E-02 | 8.9791E-04 | -1.1977E-04 | 0.0000E+00 | 0.0000E+00 |
| a16 | -5.5655E-02 | 1.1835E-02 | 1.6783E-04 | 1.4347E-04 | 0.0000E+00 | 0.0000E+00 |

FIG. 29

| Third Example | | | | | | |
|---|---|---|---|---|---|---|
| F= 2.897 mm, HFOV= 38.31 deg., Fno= 2.0 | | | | | | |
| No. | | Curvature Radius | Ape. Stop Distance Lens Thickness Air Gap | | Refractive Index | Abbe No. | Focal Length |
| | Object | Infinity | Infinity | | | | |
| 80 | Ape. Stop | Infinity | -0.1000 | | | | |
| 11 | First Lens | 1.6736 | 0.4840 | $T_1$ | 1.535 | 55.712 | 2.471 |
| 12 | | -5.7492 | 0.0690 | $G_{12}$ | | | |
| 21 | Second Lens | 15.0018 | 0.2124 | $T_2$ | 1.643 | 22.437 | -3.578 |
| 22 | | 1.9966 | 0.2074 | $G_{23}$ | | | |
| 31 | Third Lens | -9.0243 | 0.4011 | $T_3$ | 1.535 | 55.712 | 5.302 |
| 32 | | -2.1974 | 0.0858 | $G_{34}$ | | | |
| 41 | Fourth Lens | -2.3328 | 0.2893 | $T_4$ | 1.535 | 55.712 | 10.312 |
| 42 | | -1.7122 | 0.1205 | $G_{45}$ | | | |
| 51 | Fifth Lens | 2.5121 | 0.3210 | $T_5$ | 1.535 | 55.712 | -10.710 |
| 52 | | 1.6702 | 0.1268 | $G_{56}$ | | | |
| 61 | Sixth Lens | 2.1410 | 0.2862 | $T_6$ | 1.531 | 55.744 | 741.086 |
| 62 | | 2.0526 | 0.4000 | | | | |
| 70 | IR Filter | Infinity | 0.2100 | | | | |
| | IR Filter-Image Plane | Infinity | 0.6525 | | | | |
| 71 | Image Plane | Infinity | | | | | |

FIG. 30

| No. | 11 | 12 | 21 | 22 | 31 | 32 |
|---|---|---|---|---|---|---|
| K | -6.2251E-01 | 0.0000E+00 | 0.0000E+00 | -1.4705E+01 | 0.0000E+00 | -3.2147E+01 |
| a4 | 2.4077E-02 | -2.6873E-01 | -6.2773E-01 | -2.4875E-01 | -2.1485E-01 | -6.2138E-02 |
| a6 | -5.0199E-02 | 6.0582E-01 | 1.3174E+00 | 5.0523E-01 | -2.6314E-01 | -2.5133E-01 |
| a8 | 9.8585E-02 | -1.0685E+00 | -1.8621E+00 | -7.6949E-01 | 1.6445E-01 | 3.6259E-01 |
| a10 | -2.3002E-01 | 4.6155E-01 | 6.3288E-01 | 2.5787E-02 | 2.4308E-01 | 3.1117E-02 |
| a12 | -5.4398E-02 | 8.1810E-02 | 3.4553E-01 | 6.0390E-01 | -1.1522E-01 | -7.4142E-02 |
| a14 | 4.7754E-01 | 0.0000E+00 | 6.4701E-02 | -5.0164E-01 | 0.0000E+00 | 0.0000E+00 |
| a16 | -4.3915E-01 | 0.0000E+00 | -3.5822E-02 | 2.3056E-01 | 0.0000E+00 | 0.0000E+00 |
| No. | 41 | 42 | 51 | 52 | 61 | 62 |
| K | -4.1585E+00 | -1.6969E+00 | -1.1736E+01 | 0.0000E+00 | -1.5282E+01 | -7.5075E+00 |
| a4 | 2.7779E-02 | 1.5592E-01 | -1.3712E-01 | -1.4009E-01 | -1.2918E-01 | -8.2976E-02 |
| a6 | 7.3166E-01 | 3.4462E-01 | 9.0233E-02 | 2.3451E-02 | 4.2577E-02 | 2.7028E-02 |
| a8 | -1.3616E+00 | -3.1572E-01 | -7.5523E-02 | -2.6446E-04 | -3.9549E-03 | -7.2436E-03 |
| a10 | 1.9206E+00 | 1.2451E-02 | 9.9029E-03 | 0.0000E+00 | 0.0000E+00 | 3.3934E-04 |
| a12 | -2.2123E+00 | 4.1003E-02 | 1.1578E-02 | 0.0000E+00 | 0.0000E+00 | 1.2785E-04 |
| a14 | 1.4165E+00 | 0.0000E+00 | -2.8787E-03 | 0.0000E+00 | 0.0000E+00 | -2.3443E-06 |
| a16 | -3.7676E-01 | 0.0000E+00 | 0.0000E+00 | 0.0000E+00 | 0.0000E+00 | -6.3819E-07 |

FIG. 31

| | | Curvature Radius | Ape. Stop Distance Lens Thickness Air Gap | | Refractive Index | Abbe No. | Focal Length |
|---|---|---|---|---|---|---|---|
| | \multicolumn{7}{c}{Fourth Example} |
| | \multicolumn{7}{c}{F= 2.883 mm, HFOV= 38.92 deg., Fno= 2.0} |
| No. | Object | Infinity | Infinity | | | | |
| 80 | Ape. Stop | Infinity | -7.9164 | | | | |
| 11 | First Lens | 1.7181 | 0.4718 | $T_1$ | 1.535 | 55.712 | 2.459 |
| 12 | | -5.1498 | 0.0774 | $G_{12}$ | | | |
| 21 | Second Lens | 13.9297 | 0.2334 | $T_2$ | 1.643 | 22.437 | -3.736 |
| 22 | | 2.0486 | 0.2300 | $G_{23}$ | | | |
| 31 | Third Lens | -7.8164 | 0.2971 | $T_3$ | 1.535 | 55.712 | 5.408 |
| 32 | | -2.1448 | 0.1151 | $G_{34}$ | | | |
| 41 | Fourth Lens | -2.2359 | 0.4120 | $T_4$ | 1.535 | 55.712 | 9.222 |
| 42 | | -1.6394 | 0.1422 | $G_{45}$ | | | |
| 51 | Fifth Lens | 2.2330 | 0.3871 | $T_5$ | 1.535 | 55.712 | -8.126 |
| 52 | | 1.3875 | 0.1472 | $G_{56}$ | | | |
| 61 | Sixth Lens | 2.1464 | 0.2557 | $T_6$ | 1.531 | 55.744 | -2113.673 |
| 62 | | 2.0536 | 0.3000 | | | | |
| 70 | IR Filter | Infinity | 0.2100 | | | | |
| | IR Filter-Image Plane | Infinity | 0.5208 | | | | |
| 71 | Image Plane | Infinity | | | | | |

FIG. 32

| No. | 11 | 12 | 21 | 22 | 31 | 32 |
|---|---|---|---|---|---|---|
| K | -1.4608E+01 | -1.2968E+02 | 0.0000E+00 | -3.2762E+01 | 0.0000E+00 | 0.0000E+00 |
| a4 | 3.1103E-01 | 5.8903E-02 | 1.5694E-02 | 2.1988E-01 | -1.0778E-01 | -9.0251E-02 |
| a6 | -4.0069E-01 | -1.5239E-01 | -3.0856E-01 | -6.2106E-01 | -2.7114E-02 | 6.1456E-02 |
| a8 | 3.6098E-01 | -2.0094E-01 | -8.6911E-02 | 3.1010E-01 | 1.3368E-01 | 1.5173E-01 |
| a10 | -2.0696E-01 | 2.0486E-01 | 2.8045E-01 | 1.1376E-01 | 5.1418E-02 | 4.2087E-02 |
| a12 | 8.7281E-02 | 3.9777E-01 | 4.0294E-01 | -1.2007E-01 | 0.0000E+00 | 0.0000E+00 |
| a14 | -4.1297E-01 | 3.6978E-02 | -1.4256E-01 | -2.1129E-01 | 0.0000E+00 | 0.0000E+00 |
| a16 | 3.3921E-01 | -6.9633E-01 | -3.8040E-01 | 2.5943E-01 | 0.0000E+00 | 0.0000E+00 |
| No. | 41 | 42 | 51 | 52 | 61 | 62 |
| K | -3.1379E+01 | -1.6758E+00 | -5.7869E+00 | -5.0993E+00 | 0.0000E+00 | 0.0000E+00 |
| a4 | -5.3858E-02 | 1.5537E-01 | -2.2376E-01 | -1.5627E-01 | -2.1209E-01 | -1.8673E-01 |
| a6 | 2.8953E-01 | -1.1436E-01 | 4.6665E-02 | 2.9248E-02 | 2.5365E-02 | 4.7983E-02 |
| a8 | -3.0892E-01 | 5.7170E-02 | -1.5237E-02 | -1.2732E-02 | 7.3904E-03 | -6.9718E-03 |
| a10 | 2.2847E-01 | 1.3112E-01 | 6.1433E-04 | 2.3020E-03 | -1.4429E-03 | 7.9077E-05 |
| a12 | -1.8836E-01 | -1.3340E-01 | 2.1838E-03 | -8.5032E-05 | 0.0000E+00 | 0.0000E+00 |
| a14 | 8.6444E-02 | 1.2426E-02 | 7.9966E-04 | -1.2405E-04 | 0.0000E+00 | 0.0000E+00 |
| a16 | -4.4665E-02 | 1.1817E-02 | 8.1513E-05 | 1.4534E-04 | 0.0000E+00 | 0.0000E+00 |

FIG. 33

| \multicolumn{7}{c|}{Fifth Example} |
|---|---|---|---|---|---|---|
| \multicolumn{7}{c|}{F= 2.781 mm, HFOV= 39.97 deg., Fno= 2.0} |
| No. | | Curvature Radius | Ape. Stop Distance Lens Thickness Air Gap | | Refractive Index | Abbe No. | Focal Length |
| | Object | Infinity | Infinity | | | | |
| 80 | Ape. Stop | Infinity | -0.1000 | | | | |
| 11 | First Lens | 1.6870 | 0.4654 | $T_1$ | 1.535 | 55.712 | 2.462 |
| 12 | | -5.5129 | 0.0799 | $G_{12}$ | | | |
| 21 | Second Lens | 12.2461 | 0.2078 | $T_2$ | 1.643 | 22.437 | -3.740 |
| 22 | | 2.0093 | 0.2205 | $G_{23}$ | | | |
| 31 | Third Lens | -8.8032 | 0.3712 | $T_3$ | 1.535 | 55.712 | 5.036 |
| 32 | | -2.0987 | 0.0938 | $G_{34}$ | | | |
| 41 | Fourth Lens | -2.3280 | 0.3371 | $T_4$ | 1.535 | 55.712 | 10.327 |
| 42 | | -1.7224 | 0.0793 | $G_{45}$ | | | |
| 51 | Fifth Lens | 2.4843 | 0.3387 | $T_5$ | 1.535 | 55.712 | -9.179 |
| 52 | | 1.5730 | 0.1324 | $G_{56}$ | | | |
| 61 | Sixth Lens | 2.1638 | 0.3792 | $T_6$ | 1.531 | 55.744 | 196.102 |
| 62 | | 2.0750 | 0.3000 | | | | |
| 70 | IR Filter | Infinity | 0.2100 | | | | |
| | IR Filter- Image Plane | Infinity | 0.5712 | | | | |
| 71 | Image Plane | Infinity | | | | | |

FIG. 34

| No. | 11 | 12 | 21 | 22 | 31 | 32 |
|---|---|---|---|---|---|---|
| K | -1.3561E+01 | -1.3535E+02 | 0.0000E+00 | -2.8780E+01 | 0.0000E+00 | 0.0000E+00 |
| a4 | 3.0887E-01 | 4.6851E-02 | 8.9235E-03 | 2.1766E-01 | -1.1402E-01 | -9.5477E-02 |
| a6 | -4.0181E-01 | -1.4504E-01 | -3.2601E-01 | -6.1247E-01 | -8.7123E-03 | 6.4914E-02 |
| a8 | 3.4862E-01 | -2.2874E-01 | -7.5346E-02 | 3.0111E-01 | 1.5306E-01 | 1.5418E-01 |
| a10 | -2.4051E-01 | 2.3757E-01 | 2.5655E-01 | 9.2146E-02 | 1.9337E-02 | 4.5619E-02 |
| a12 | 6.8696E-02 | 2.6155E-01 | 3.2422E-01 | -1.5641E-01 | 0.0000E+00 | 0.0000E+00 |
| a14 | -3.7407E-01 | 7.1085E-03 | -1.4623E-01 | -1.0331E-01 | 0.0000E+00 | 0.0000E+00 |
| a16 | 3.8290E-01 | -5.9286E-01 | -2.3589E-01 | 2.2237E-01 | 0.0000E+00 | 0.0000E+00 |
| No. | 41 | 42 | 51 | 52 | 61 | 62 |
| K | -2.9426E+01 | -1.5129E+00 | -5.8442E+00 | -5.2252E+00 | 0.0000E+00 | 0.0000E+00 |
| a4 | -5.2807E-02 | 1.5264E-01 | -2.2170E-01 | -1.5248E-01 | -2.1080E-01 | -1.8930E-01 |
| a6 | 2.8727E-01 | -1.1832E-01 | 4.5490E-02 | 3.0921E-02 | 2.5544E-02 | 4.7711E-02 |
| a8 | -3.0442E-01 | 5.7813E-02 | -1.2131E-02 | -1.2147E-02 | 7.3749E-03 | -7.0120E-03 |
| a10 | 2.3554E-01 | 1.3218E-01 | 8.9111E-04 | 2.4052E-03 | -1.4359E-03 | 5.9870E-05 |
| a12 | -1.8228E-01 | -1.3281E-01 | 2.0126E-03 | -7.3381E-05 | 0.0000E+00 | 0.0000E+00 |
| a14 | 9.1092E-02 | 1.2256E-02 | 9.0585E-04 | -1.2211E-04 | 0.0000E+00 | 0.0000E+00 |
| a16 | -4.1785E-02 | 1.1363E-02 | 9.4541E-05 | 1.3527E-04 | 0.0000E+00 | 0.0000E+00 |

FIG. 35

| Sixth Example ||||||||
|---|---|---|---|---|---|---|---|
| F= 2.651 mm, HFOV= 40.99 deg., Fno= 1.8 ||||||||
| No. | | Curvature Radius | Ape. Stop Distance Lens Thickness Air Gap | | Refractive Index | Abbe No. | Focal Length |
| | Object | Infinity | Infinity | | | | |
| 80 | Ape. Stop | Infinity | -0.1500 | | | | |
| 11 | First Lens | 1.6394 | 0.3804 | $T_1$ | 1.535 | 55.712 | 3.867 |
| 12 | | 7.1628 | 0.2899 | $G_{12}$ | | | |
| 21 | Second Lens | 3.0281 | 0.1702 | $T_2$ | 1.643 | 22.437 | -5.186 |
| 22 | | 1.5575 | 0.0955 | $G_{23}$ | | | |
| 31 | Third Lens | 3.7156 | 0.4932 | $T_3$ | 1.535 | 55.712 | 2.583 |
| 32 | | -2.1089 | 0.0825 | $G_{34}$ | | | |
| 41 | Fourth Lens | -0.6772 | 0.2745 | $T_4$ | 1.643 | 22.437 | -4.365 |
| 42 | | -1.0322 | 0.0582 | $G_{45}$ | | | |
| 51 | Fifth Lens | 1.1401 | 0.3967 | $T_5$ | 1.535 | 55.712 | 2.860 |
| 52 | | 3.8919 | 0.0372 | $G_{56}$ | | | |
| 61 | Sixth Lens | 1.7836 | 0.3244 | $T_6$ | 1.531 | 55.744 | -3.923 |
| 62 | | 0.9016 | 0.6720 | | | | |
| 70 | IR Filter | Infinity | 0.2100 | | | | |
| | IR Filter-Image Plane | Infinity | 0.3151 | | | | |
| 71 | Image Plane | Infinity | | | | | |

FIG. 36

| No. | 11 | 12 | 21 | 22 | 31 | 32 |
|---|---|---|---|---|---|---|
| K | -1.3780E+00 | 0.0000E+00 | 0.0000E+00 | -1.2496E+01 | 0.0000E+00 | -2.4438E+01 |
| a4 | 1.7368E-03 | -1.9291E-01 | -6.6325E-01 | -2.8427E-01 | -2.1094E-01 | -1.4862E-01 |
| a6 | 2.1577E-04 | 4.3136E-01 | 1.1727E+00 | 5.7046E-01 | -1.5051E-01 | -2.7178E-01 |
| a8 | 6.5792E-02 | -1.0357E+00 | -1.9432E+00 | -7.7692E-01 | 2.0498E-01 | 3.2867E-01 |
| a10 | -3.4345E-01 | 8.8077E-01 | 8.3255E-01 | -7.3317E-02 | 1.9155E-01 | 6.0054E-02 |
| a12 | -4.4830E-02 | -3.7682E-01 | 3.9779E-01 | 6.5064E-01 | -1.3332E-01 | -4.7036E-02 |
| a14 | 6.6824E-01 | 0.0000E+00 | -2.1011E-01 | -3.6547E-01 | 0.0000E+00 | 0.0000E+00 |
| a16 | -6.9279E-01 | 0.0000E+00 | 2.4097E-01 | 1.1797E-01 | 0.0000E+00 | 0.0000E+00 |
| No. | 41 | 42 | 51 | 52 | 61 | 62 |
| K | -5.2410E+00 | -1.4698E+00 | -1.1935E+01 | 0.0000E+00 | -1.8516E+01 | -5.6199E+00 |
| a4 | -4.4903E-03 | 1.2191E-01 | -6.4370E-02 | -5.0794E-02 | -1.1837E-01 | -9.5581E-02 |
| a6 | 6.4555E-01 | 3.6875E-01 | 2.0769E-02 | -7.8734E-03 | 4.4507E-02 | 3.3514E-02 |
| a8 | -1.2352E+00 | -3.0115E-01 | -4.9569E-02 | 1.3365E-03 | -4.6945E-03 | -8.5972E-03 |
| a10 | 1.9963E+00 | 1.9522E-02 | 1.5432E-02 | 0.0000E+00 | 0.0000E+00 | 4.2769E-04 |
| a12 | -2.2926E+00 | 2.5883E-02 | 5.4267E-03 | 0.0000E+00 | 0.0000E+00 | 2.0074E-04 |
| a14 | 1.3410E+00 | 0.0000E+00 | -3.3151E-03 | 0.0000E+00 | 0.0000E+00 | 6.0049E-06 |
| a16 | -3.0576E-01 | 0.0000E+00 | 0.0000E+00 | 0.0000E+00 | 0.0000E+00 | -5.9930E-06 |

FIG. 37

| | | Seventh Example | | | | | |
|---|---|---|---|---|---|---|---|
| | | F= 2.637 mm, HFOV= 40.99 deg., Fno= 1.8 | | | | | |
| No. | | Curvature Radius | Ape. Stop Distance Lens Thickness Air Gap | | Refractive Index | Abbe No. | Focal Length |
| | Object | Infinity | Infinity | | | | |
| 80 | Ape. Stop | Infinity | -0.1000 | | | | |
| 11 | First Lens | 1.8568 | 0.4577 | $T_1$ | 1.535 | 55.712 | 3.175 |
| 12 | | -18.9489 | 0.0700 | $G_{12}$ | | | |
| 21 | Second Lens | 3.5000 | 0.2300 | $T_2$ | 1.643 | 22.437 | -3.702 |
| 22 | | 1.3865 | 0.1298 | $G_{23}$ | | | |
| 31 | Third Lens | 3.4732 | 0.3890 | $T_3$ | 1.535 | 55.712 | 3.299 |
| 32 | | -3.4720 | 0.1132 | $G_{34}$ | | | |
| 41 | Fourth Lens | -1.4060 | 0.4182 | $T_4$ | 1.535 | 55.712 | 10.906 |
| 42 | | -1.2515 | 0.0332 | $G_{45}$ | | | |
| 51 | Fifth Lens | 1.4371 | 0.2051 | $T_5$ | 1.535 | 55.712 | 39.787 |
| 52 | | 1.4640 | 0.1301 | $G_{56}$ | | | |
| 61 | Sixth Lens | 2.3252 | 0.4771 | $T_6$ | 1.531 | 55.744 | -8.360 |
| 62 | | 1.4187 | 0.5989 | | | | |
| 70 | IR Filter | Infinity | 0.2100 | | | | |
| | IR Filter-Image Plane | Infinity | 0.2892 | | | | |
| 71 | Image Plane | Infinity | | | | | |

FIG. 38

| No. | 11 | 12 | 21 | 22 | 31 | 32 |
|---|---|---|---|---|---|---|
| K | 0.0000E+00 | 0.0000E+00 | 0.0000E+00 | -8.9593E+00 | 0.0000E+00 | 0.0000E+00 |
| a4 | 6.9538E-02 | 5.8117E-03 | -4.4097E-01 | -2.7105E-01 | -4.2135E-01 | -5.5616E-02 |
| a6 | -1.8695E-01 | -9.8230E-02 | 5.5940E-01 | 3.5875E-01 | 3.0071E-01 | 1.3295E-01 |
| a8 | 2.0307E-01 | 7.0016E-02 | -7.7084E-01 | -6.2650E-01 | 0.0000E+00 | 0.0000E+00 |
| a10 | -1.3240E-01 | -3.6100E-02 | 4.4026E-01 | 3.5555E-01 | 0.0000E+00 | 0.0000E+00 |
| a12 | 0.0000E+00 | 0.0000E+00 | 0.0000E+00 | 0.0000E+00 | 0.0000E+00 | 0.0000E+00 |
| a14 | 0.0000E+00 | 0.0000E+00 | 0.0000E+00 | 0.0000E+00 | 0.0000E+00 | 0.0000E+00 |
| a16 | 0.0000E+00 | 0.0000E+00 | 0.0000E+00 | 0.0000E+00 | 0.0000E+00 | 0.0000E+00 |
| No. | 41 | 42 | 51 | 52 | 61 | 62 |
| K | 0.0000E+00 | -1.0239E+00 | -1.6940E+00 | -5.2883E+00 | 0.0000E+00 | -4.5381E+00 |
| a4 | 7.0016E-01 | 4.0242E-01 | -2.9282E-01 | -1.7254E-01 | -2.2571E-01 | -1.3896E-01 |
| a6 | -3.9235E-01 | -3.8424E-01 | 5.2897E-02 | -2.5882E-03 | 5.7844E-02 | 9.5393E-02 |
| a8 | 1.1738E-01 | 5.3069E-01 | -2.6915E-02 | 5.6430E-03 | -5.1693E-03 | -5.2791E-02 |
| a10 | -4.1540E-02 | -4.3773E-01 | 1.9006E-02 | 0.0000E+00 | 0.0000E+00 | 1.9087E-02 |
| a12 | 0.0000E+00 | 1.2517E-01 | -4.0640E-02 | 0.0000E+00 | 0.0000E+00 | -4.5161E-03 |
| a14 | 0.0000E+00 | 8.9726E-03 | 1.8363E-02 | 0.0000E+00 | 0.0000E+00 | 6.5571E-04 |
| a16 | 0.0000E+00 | 0.0000E+00 | -1.0935E-03 | 0.0000E+00 | 0.0000E+00 | -4.6340E-05 |

FIG. 39

| | | Eighth Example | | | | |
|---|---|---|---|---|---|---|
| | | F= 2.747 mm, HFOV= 40.00 deg., Fno= 1.8 | | | | |
| No. | | Curvature Radius | Ape. Stop Distance Lens Thickness Air Gap | Refractive Index | Abbe No. | Focal Length |
| | Object | Infinity | Infinity | | | |
| 80 | Ape. Stop | Infinity | -0.1500 | | | |
| 11 | First Lens | 1.6927 | 0.5197 T$_1$ | 1.535 | 55.712 | 3.698 |
| 12 | | 10.2561 | 0.0705 G$_{12}$ | | | |
| 21 | Second Lens | 3.3915 | 0.2124 T$_2$ | 1.643 | 22.437 | -5.436 |
| 22 | | 1.6853 | 0.1411 G$_{23}$ | | | |
| 31 | Third Lens | 2.9837 | 0.3617 T$_3$ | 1.535 | 55.712 | 2.873 |
| 32 | | -3.0560 | 0.2235 G$_{34}$ | | | |
| 41 | Fourth Lens | -0.6943 | 0.2634 T$_4$ | 1.643 | 22.437 | -5.679 |
| 42 | | -0.9835 | 0.0796 G$_{45}$ | | | |
| 51 | Fifth Lens | 1.2889 | 0.3962 T$_5$ | 1.535 | 55.712 | 3.886 |
| 52 | | 3.0106 | 0.0864 G$_{56}$ | | | |
| 61 | Sixth Lens | 2.5449 | 0.3408 T$_6$ | 1.531 | 55.744 | -5.018 |
| 62 | | 1.2432 | 0.5962 | | | |
| 70 | IR Filter | Infinity | 0.2100 | | | |
| | IR Filter-Image Plane | Infinity | 0.2993 | | | |
| 71 | Image Plane | Infinity | | | | |

FIG. 40

| No. | 11 | 12 | 21 | 22 | 31 | 32 |
|---|---|---|---|---|---|---|
| K | -6.2251E-01 | 0.0000E+00 | 0.0000E+00 | -1.4705E+01 | 0.0000E+00 | -3.2147E+01 |
| a4 | 2.4077E-02 | -2.6873E-01 | -6.2773E-01 | -2.4875E-01 | -2.1485E-01 | -6.2138E-02 |
| a6 | -5.0199E-02 | 6.0582E-01 | 1.3174E+00 | 5.0523E-01 | -2.6314E-01 | -2.5133E-01 |
| a8 | 9.8585E-02 | -1.0685E+00 | -1.8621E+00 | -7.6949E-01 | 1.6445E-01 | 3.6259E-01 |
| a10 | -2.3002E-01 | 4.6155E-01 | 6.3288E-01 | 2.5787E-02 | 2.4308E-01 | 3.1117E-02 |
| a12 | -5.4398E-02 | 8.1810E-02 | 3.4553E-01 | 6.0390E-01 | -1.1522E-01 | -7.4142E-02 |
| a14 | 4.7754E-01 | 0.0000E+00 | 6.4701E-02 | -5.0164E-01 | 0.0000E+00 | 0.0000E+00 |
| a16 | -4.3915E-01 | 0.0000E+00 | -3.5822E-02 | 2.3056E-01 | 0.0000E+00 | 0.0000E+00 |
| No. | 41 | 42 | 51 | 52 | 61 | 62 |
| K | -4.1585E+00 | -1.6969E+00 | -1.1736E+01 | 0.0000E+00 | -1.5282E+01 | -7.5075E+00 |
| a4 | 2.7779E-02 | 1.5592E-01 | -1.3712E-01 | -1.4009E-01 | -1.2918E-01 | -8.2976E-02 |
| a6 | 7.3166E-01 | 3.4462E-01 | 9.0233E-02 | 2.3451E-02 | 4.2577E-02 | 2.7028E-02 |
| a8 | -1.3616E+00 | -3.1572E-01 | -7.5523E-02 | -2.6446E-04 | -3.9549E-03 | -7.2436E-03 |
| a10 | 1.9206E+00 | 1.2451E-02 | 9.9029E-03 | 0.0000E+00 | 0.0000E+00 | 3.3934E-04 |
| a12 | -2.2123E+00 | 4.1003E-02 | 1.1578E-02 | 0.0000E+00 | 0.0000E+00 | 1.2785E-04 |
| a14 | 1.4165E+00 | 0.0000E+00 | -2.8787E-03 | 0.0000E+00 | 0.0000E+00 | -2.3443E-06 |
| a16 | -3.7676E-01 | 0.0000E+00 | 0.0000E+00 | 0.0000E+00 | 0.0000E+00 | -6.3819E-07 |

FIG. 41

| Ninth Example ||||||||
| F= 2.747 mm, HFOV= 40.00 deg., Fno= 1.8 ||||||||
| No. | | Curvature Radius | Ape. Stop Distance Lens Thickness Air Gap | | Refractive Index | Abbe No. | Focal Length |
| --- | --- | --- | --- | --- | --- | --- | --- |
| | Object | Infinity | Infinity | | | | |
| 80 | Ape. Stop | Infinity | -0.2000 | | | | |
| 11 | First Lens | 2.1184 | 0.7788 | $T_1$ | 1.535 | 55.712 | 3.298 |
| 12 | | -9.3950 | 0.1491 | $G_{12}$ | | | |
| 21 | Second Lens | -30.5034 | 0.2049 | $T_2$ | 1.643 | 22.437 | -4.419 |
| 22 | | 3.1682 | 0.1805 | $G_{23}$ | | | |
| 31 | Third Lens | 5.4335 | 0.5845 | $T_3$ | 1.535 | 55.712 | 6.465 |
| 32 | | -9.2426 | 0.2866 | $G_{34}$ | | | |
| 41 | Fourth Lens | -1.5548 | 0.5062 | $T_4$ | 1.535 | 55.712 | 3.022 |
| 42 | | -0.8842 | 0.0641 | $G_{45}$ | | | |
| 51 | Fifth Lens | -4.7077 | 0.3757 | $T_5$ | 1.535 | 55.712 | 12.267 |
| 52 | | -2.8216 | 0.0662 | $G_{56}$ | | | |
| 61 | Sixth Lens | -8.4506 | 0.6363 | $T_6$ | 1.531 | 55.744 | -2.140 |
| 62 | | 1.3524 | 0.4000 | | | | |
| 70 | IR Filter | Infinity | 0.3000 | | | | |
| | IR Filter-Image Plane | Infinity | 0.5595 | | | | |
| 71 | Image Plane | Infinity | | | | | |

FIG. 42

| No. | 11 | 12 | 21 | 22 | 31 | 32 |
|---|---|---|---|---|---|---|
| K | 0.0000E+00 | 0.0000E+00 | 0.0000E+00 | 0.0000E+00 | 0.0000E+00 | 0.0000E+00 |
| a4 | -8.0271E-03 | 4.9802E-02 | 3.9256E-02 | -3.8825E-02 | -1.2187E-01 | -1.2070E-01 |
| a6 | 2.5966E-02 | -4.4269E-02 | -1.4585E-02 | 7.0054E-02 | 4.5005E-02 | 5.6565E-02 |
| a8 | -6.4904E-02 | -4.7661E-02 | -1.2266E-01 | -1.2250E-01 | 0.0000E+00 | 0.0000E+00 |
| a10 | 6.4282E-02 | 3.4542E-02 | 4.9375E-02 | 6.0778E-02 | 0.0000E+00 | 0.0000E+00 |
| a12 | -2.9186E-02 | -1.2059E-02 | 1.6101E-03 | -1.0267E-02 | 0.0000E+00 | 0.0000E+00 |
| a14 | 0.0000E+00 | 0.0000E+00 | 0.0000E+00 | 0.0000E+00 | 0.0000E+00 | 0.0000E+00 |
| a16 | 0.0000E+00 | 0.0000E+00 | 0.0000E+00 | 0.0000E+00 | 0.0000E+00 | 0.0000E+00 |
| No. | 41 | 42 | 51 | 52 | 61 | 62 |
| K | 0.0000E+00 | -1.0332E+00 | 0.0000E+00 | 0.0000E+00 | 0.0000E+00 | -6.6803E+00 |
| a4 | -1.7277E-01 | 1.4315E-01 | 1.6122E-01 | 8.1053E-02 | -2.4039E-02 | -5.2815E-02 |
| a6 | 4.4363E-01 | -5.5805E-02 | -1.5673E-01 | -3.7111E-02 | 1.6258E-04 | 2.4011E-02 |
| a8 | -2.7429E-01 | 8.0391E-02 | 7.0140E-02 | 7.9622E-03 | 3.2597E-03 | -8.3917E-03 |
| a10 | 8.2724E-02 | -5.6933E-02 | -2.1020E-02 | -4.5127E-05 | -6.1121E-04 | 1.6591E-03 |
| a12 | -9.2788E-03 | 1.4088E-02 | 2.8668E-03 | -1.1316E-04 | 2.6824E-05 | -1.7981E-04 |
| a14 | 0.0000E+00 | 0.0000E+00 | 0.0000E+00 | 0.0000E+00 | 6.6815E-07 | 8.1082E-06 |
| a16 | 0.0000E+00 | 0.0000E+00 | 0.0000E+00 | 0.0000E+00 | 0.0000E+00 | 0.0000E+00 |

FIG. 43

| | First Example | Second Example | Third Example | Fourth Example | Fifth Example | Sixth Example | Seventh Example | Eighth Example | Ninth Example |
|---|---|---|---|---|---|---|---|---|---|
| $AAG/T_2$ | 2.767 | 2.501 | 2.869 | 3.049 | 2.917 | 3.310 | 2.071 | 2.829 | 3.643 |
| $AG_{34}/(AG_{12}+AG_{45})$ | 0.416 | 0.492 | 0.453 | 0.524 | 0.589 | 0.237 | 1.097 | 1.489 | 1.344 |
| $ALT/AG_{23}$ | 8.564 | 11.792 | 9.614 | 8.945 | 9.519 | 21.355 | 16.775 | 14.842 | 17.102 |
| $T_5/(AG_{12}+AG_{45})$ | 1.961 | 2.981 | 1.694 | 1.763 | 2.127 | 1.140 | 1.988 | 2.640 | 1.762 |
| $(AG_{12}+AG_{45})/AG_{22}$ | 0.780 | 0.727 | 0.914 | 0.955 | 0.722 | 3.645 | 0.795 | 1.064 | 1.181 |
| $ALT/AG_{34}$ | 26.399 | 32.981 | 23.240 | 17.878 | 22.392 | 24.722 | 19.229 | 9.372 | 10.769 |
| $T_5/AG_{34}$ | 4.713 | 6.064 | 3.741 | 3.364 | 3.613 | 4.809 | 1.812 | 1.773 | 1.311 |
| $T_3/T_5$ | 0.967 | 0.831 | 1.250 | 0.768 | 1.096 | 1.243 | 1.896 | 0.913 | 1.556 |
| $ALT/(AG_{12}+AG_{45})$ | 10.983 | 16.213 | 10.523 | 9.369 | 13.183 | 5.858 | 21.095 | 13.954 | 14.476 |
| $T_1/T_3$ | 1.376 | 1.390 | 1.207 | 1.588 | 1.254 | 0.771 | 1.176 | 1.437 | 1.332 |
| $T_1/AG_{34}$ | 6.272 | 6.998 | 5.641 | 4.100 | 4.964 | 4.611 | 4.042 | 2.326 | 2.718 |
| $T_3/T_6$ | 0.895 | 1.331 | 1.402 | 1.162 | 0.979 | 1.520 | 0.815 | 1.061 | 0.919 |
| $AAG/T_5$ | 1.691 | 1.322 | 1.899 | 1.839 | 1.789 | 1.420 | 2.322 | 1.517 | 1.987 |
| $T_1/AAG$ | 0.787 | 0.873 | 0.794 | 0.663 | 0.768 | 0.675 | 0.961 | 0.865 | 1.043 |
| $T_3/(AG_{12}+AG_{45})$ | 1.897 | 2.476 | 2.117 | 1.353 | 2.331 | 1.417 | 3.769 | 2.410 | 2.742 |
| $T_1/AG_{23}$ | 2.035 | 2.502 | 2.334 | 2.051 | 2.110 | 3.983 | 3.526 | 3.683 | 4.315 |

FIG. 44

OPTICAL IMAGING LENS AND ELECTRONIC DEVICE COMPRISING THE SAME

CROSS REFERENCE TO RELATED APPLICATION

This application claims priority from Chinese Patent Application No. 201510035045.7, filed on Jan. 23, 2015, the contents of which are hereby incorporated by reference in their entirety for all purposes.

BACKGROUND OF THE INVENTION

1. Field of the Invention

The present invention generally relates to an optical imaging lens set and an electronic device which includes such optical imaging lens set. Specifically speaking, the present invention is directed to a shorter optical imaging lens set of six lens elements and a shorter electronic device which includes such optical imaging lens set of six lens elements.

2. Description of the Prior Art

In recent years, the popularity of mobile phones and digital cameras makes the sizes of various portable electronic products reduce quickly, and so does that of the photography modules. The current trend of research is to develop an optical imaging lens set of a shorter length with uncompromised good quality. With the development and shrinkage of a charge coupled device (CCD) or a complementary metal oxide semiconductor element (CMOS), the optical imaging lens set installed in the photography module shrinks as well to meet the demands. However, good and necessary optical properties, such as the system aberration improvement, as well as production cost and production feasibility should be taken into consideration, too.

U.S. Pat. No. 7,830,620 discloses an optical imaging lens set of six lens elements. The first lens element has negative refractive power and the second lens element has positive refractive power. This arrangement makes the total length too long to be ideal for the size reduction of the portable devices. Therefore, how to reduce the total length of a photographic device, but still maintain good optical performance, is an important objective to research.

SUMMARY OF THE INVENTION

In light of the above, the present invention proposes an optical imaging lens set that is lightweight, has a low production cost, has an enlarged half of field of view, has a high resolution and has high image quality. The optical imaging lens set of six lens elements of the present invention from an object side toward an image side in order along an optical axis has an aperture stop, a first lens element of positive refractive power, a second lens element of negative refractive power, a third lens element, a fourth lens element, a fifth lens element and a sixth lens element. Each lens element has an object-side surface facing toward an object side as well as an image-side surface facing toward an image side. The optical imaging lens set exclusively has the first lens element, the second lens element, the third lens element, the fourth lens element, the fifth lens element and the sixth lens element with refractive power.

The first lens element has an object-side surface with a convex portion in a vicinity of the optical axis and a convex portion in a vicinity of its periphery, and an image-side surface with a convex portion in a vicinity of its periphery. The second lens element has an object-side surface with a concave portion in a vicinity of its periphery. The third lens element has an image-side surface with a concave portion in a vicinity of its periphery. The fourth lens element has an image-side surface with a convex portion in a vicinity of the optical axis. The fifth lens element has an object-side surface with a concave portion in a vicinity of its periphery. The sixth lens element has an image-side surface with a concave portion in a vicinity of the optical axis and a convex portion in a vicinity of its periphery. The sum of all five air gaps AAG between each lens elements from the first lens element to the sixth lens element along the optical axis and a second lens element thickness $T_2$ satisfy a relationship $AAG/T_2 \leq 3.6$.

In the optical imaging lens set of sixth lens elements of the present invention, an air gap $AG_{12}$ between the first lens element and the second lens element along the optical axis, an air gap $AG_{34}$ between the third lens element and the fourth lens element along the optical axis and an air gap $AG_{45}$ between the fourth lens element and the fifth lens element along the optical axis satisfy a relationship $AG_{34}/(AG_{12}+AG_{45}) \leq 1.5$.

In the optical imaging lens set of sixth lens elements of the present invention, a thickness $T_3$ of the third lens element along the optical axis and a thickness $T_5$ of the fifth lens element along the optical axis satisfy a relationship $0.75 \leq T_3/T_5$.

In the optical imaging lens set of sixth lens elements of the present invention, a total thickness ALT of the first lens element, the second lens element, the third lens element, the fourth lens element, the fifth lens element and the sixth lens element along the optical axis satisfies a relationship $9.0 \leq ALT/AG_{12}+AG_{45})$.

In the optical imaging lens set of sixth lens elements of the present invention, a thickness $T_1$ of the first lens element along the optical axis satisfies a relationship $T_1/T_3 \leq 1.6$.

In the optical imaging lens set of sixth lens elements of the present invention, a total thickness ALT of the first lens element, the second lens element, the third lens element, the fourth lens element, the fifth lens element and the sixth lens element along the optical axis and an air gap $AG_{23}$ between the second lens element and the third lens element along the optical axis satisfy a relationship $8.5 \leq ALT/AG_{23}$.

In the optical imaging lens set of sixth lens elements of the present invention, a thickness $T_1$ of the first lens element along the optical axis and an air gap $AG_{34}$ between the third lens element and the fourth lens element along the optical axis satisfy a relationship $2.3 \leq T_1/AG_{34}$.

In the optical imaging lens set of sixth lens elements of the present invention, an air gap $AG_{12}$ between the first lens element and the second lens element along the optical axis and an air gap $AG_{45}$ between the fourth lens element and the fifth lens element along the optical axis satisfy a relationship $T_5/(AG_{12}+AG_{45}) \leq 3.0$.

In the optical imaging lens set of sixth lens elements of the present invention, a thickness $T_3$ of the third lens element along the optical axis and a thickness $T_6$ of the sixth lens element along the optical axis satisfy a relationship $0.8 \leq T_3/T_6$.

In the optical imaging lens set of sixth lens elements of the present invention, the optical imaging lens set satisfies a relationship $AAG/T_5 \leq 2.0$.

In the optical imaging lens set of sixth lens elements of the present invention, an air gap $AG_{12}$ between the first lens element and the second lens element along the optical axis, an air gap $AG_{23}$ between the second lens element and the third lens element along the optical axis and an air gap $AG_{45}$ between the fourth lens element and the fifth lens element along the optical axis satisfy a relationship $0.7 \leq (AG_{12}+AG_{45})/AG_{23}$.

In the optical imaging lens set of sixth lens elements of the present invention, a thickness $T_1$ of the first lens element along the optical axis satisfies a relationship $0.65 \leq T_1/AAG$.

In the optical imaging lens set of sixth lens elements of the present invention, a total thickness ALT of the first lens element, the second lens element, the third lens element, the fourth lens element, the fifth lens element and the sixth lens element along the optical axis and an air gap $AG_{34}$ between the third lens element and the fourth lens element along the optical axis satisfy a relationship $9.0 \leq ALT/AG_{34}$.

In the optical imaging lens set of sixth lens elements of the present invention, a thickness $T_3$ of the third lens element along the optical axis, an air gap $AG_{12}$ between the first lens element and the second lens element along the optical axis and an air gap $AG_{45}$ between the fourth lens element and the fifth lens element along the optical axis satisfy a relationship $1.3 \leq T_3/(AG_{12}+AG_{45})$.

In the optical imaging lens set of sixth lens elements of the present invention, a thickness $T_5$ of the fifth lens element along the optical axis and an air gap $AG_{34}$ between the third lens element and the fourth lens element along the optical axis satisfy a relationship $1.3 \leq T_5/AG_{34}$.

In the optical imaging lens set of sixth lens elements of the present invention, a thickness $T_1$ of the first lens element along the optical axis and an air gap $AG_{23}$ between the second lens element and the third lens element along the optical axis satisfies a relationship $2.0 \leq T_1/AG_{23}$.

In the optical imaging lens set of sixth lens elements of the present invention, an air gap $AG_{12}$ between the first lens element and the second lens element along the optical axis and an air gap $AG_{45}$ between the fourth lens element and the fifth lens element along the optical axis satisfy a relationship $T_5/(AG_{12}+AG_{45}) \leq 3.0$.

The present invention also proposes an electronic device which includes the optical imaging lens set as described above. The electronic device includes a case and an image module disposed in the case. The image module includes an optical imaging lens set as described above, a barrel for the installation of the optical imaging lens set, a module housing unit for the installation of the barrel, a substrate for the installation of the module housing unit and an image sensor disposed at an image side of the optical imaging lens set.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGS. 1-5 illustrates the methods for determining the surface shapes and for determining one region is a region in a vicinity of the optical axis or the region in a vicinity of its circular periphery of one lens element.

FIG. 6 illustrates a first example of the optical imaging lens set of the present invention.

FIG. 7A illustrates the longitudinal spherical aberration on the image plane of the first example.

FIG. 7B illustrates the astigmatic aberration on the sagittal direction of the first example.

FIG. 7C illustrates the astigmatic aberration on the tangential direction of the first example.

FIG. 7D illustrates the distortion aberration of the first example.

FIG. 8 illustrates a second example of the optical imaging lens set of six lens elements of the present invention.

FIG. 9A illustrates the longitudinal spherical aberration on the image plane of the second example.

FIG. 9B illustrates the astigmatic aberration on the sagittal direction of the second example.

FIG. 9C illustrates the astigmatic aberration on the tangential direction of the second example.

FIG. 9D illustrates the distortion aberration of the second example.

FIG. 26 shows the optical data of the first example of the optical imaging lens set.

FIG. 27 shows the aspheric surface data of the first example.

FIG. 28 shows the optical data of the second example of the optical imaging lens set.

FIG. 29 shows the aspheric surface data of the second example.

FIG. 30 shows the optical data of the third example of the optical imaging lens set.

FIG. 31 shows the aspheric surface data of the third example.

FIG. 32 shows the optical data of the fourth example of the optical imaging lens set.

FIG. 33 shows the aspheric surface data of the fourth example.

FIG. 34 shows the optical data of the fifth example of the optical imaging lens set.

FIG. 35 shows the aspheric surface data of the fifth example.

FIG. 36 shows the optical data of the sixth example of the optical imaging lens set.

FIG. 37 shows the aspheric surface data of the sixth example.

FIG. 38 shows the optical data of the seventh example of the optical imaging lens set.

FIG. 39 shows the aspheric surface data of the seventh example.

FIG. 40 shows the optical data of the eighth example of the optical imaging lens set.

FIG. 41 shows the aspheric surface data of the eighth example.

FIG. 42 shows the optical data of the ninth example of the optical imaging lens set.

FIG. 43 shows the aspheric surface data of the ninth example.

FIG. 44 shows some important ratios in the examples.

DETAILED DESCRIPTION

Figure 1A:
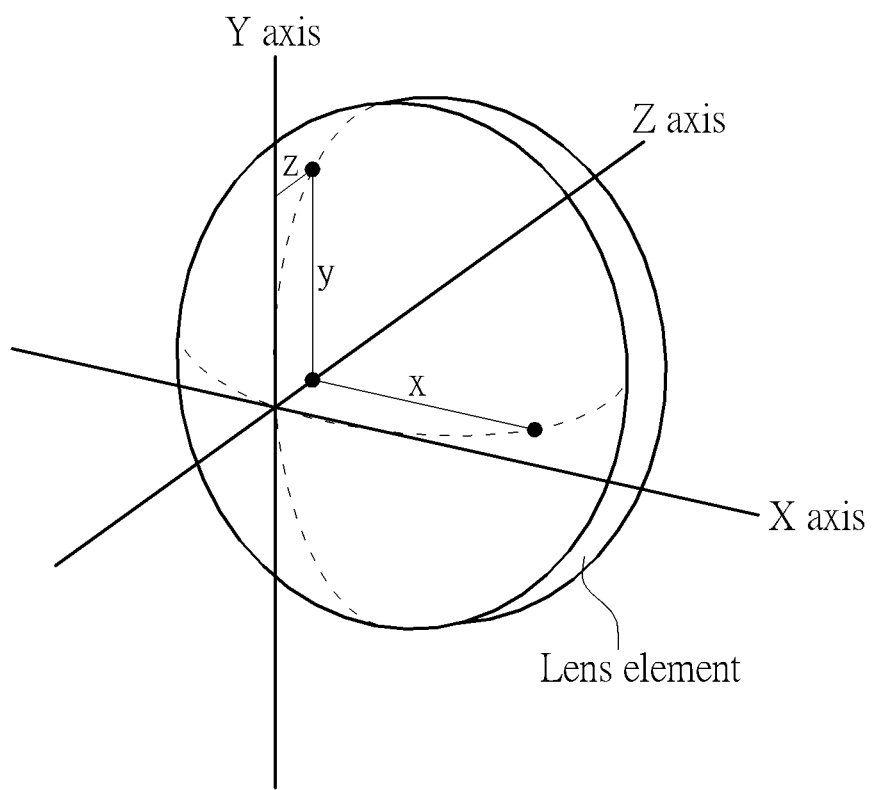
Figures 1, 2:
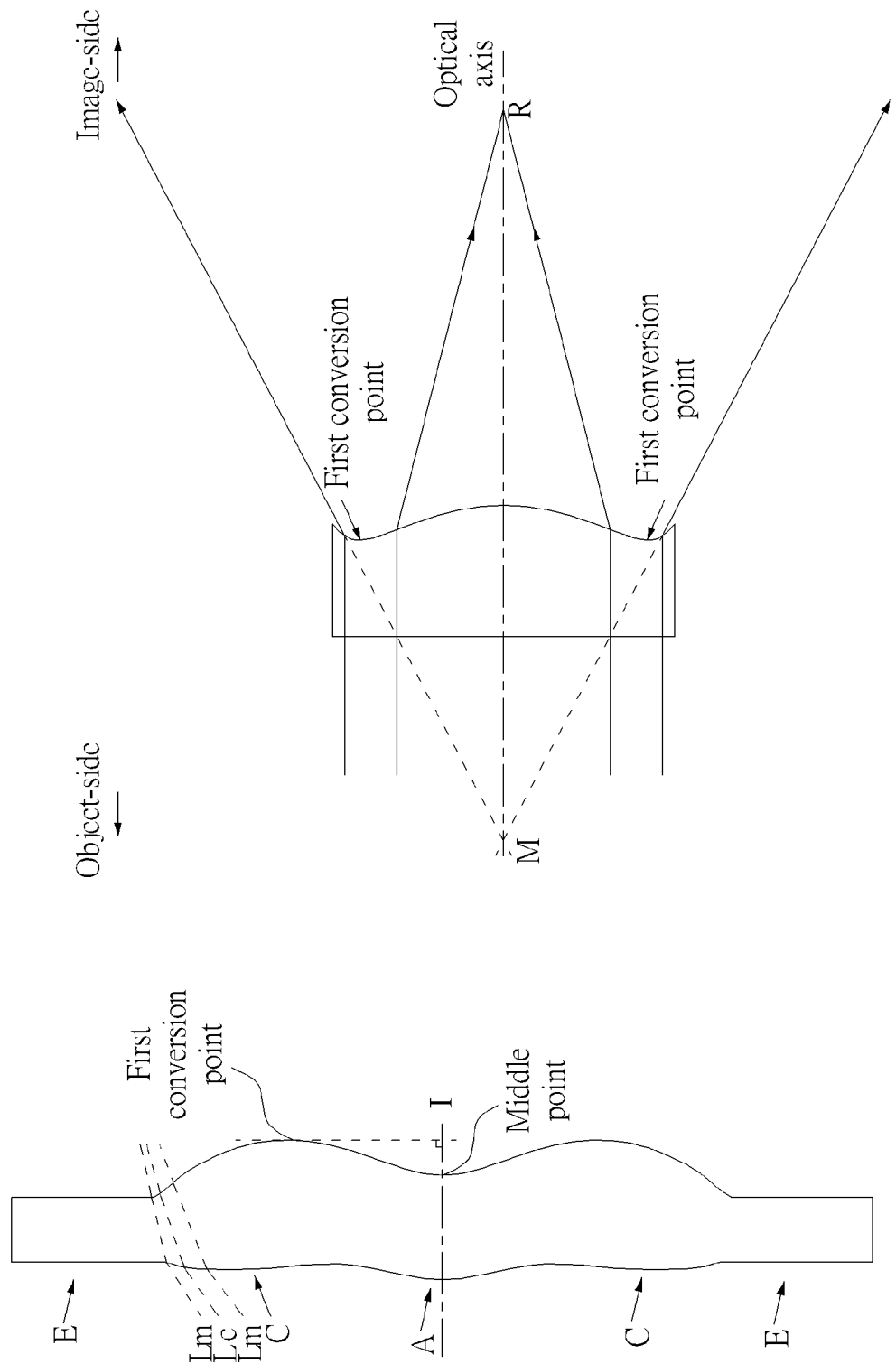

Before the detailed description of the present invention, the first thing to be noticed is that in the present invention, similar (not necessarily identical) elements are labeled as the same numeral references. In the entire present specification, "a certain lens element has negative/positive refractive power" refers to the part in a vicinity of the optical axis of the lens element has negative/positive refractive power calculated by Gaussian optical theory. An object-side/image-side surface refers to the region which allows imaging light passing through, in the drawing, imaging light includes Lc (chief ray) and Lm (marginal ray). As shown in FIG. 1, the optical axis is "I" and the lens element is symmetrical with respect to the optical axis I. The region A that near the optical axis and for light to pass through is the region in a vicinity of the optical axis, and the region C that the marginal ray passing through is the region in a vicinity of a certain lens element's circular periphery. In addition, the lens element may include an extension part E for the lens element to be installed in an optical imaging lens set (that is the region outside the region C perpendicular to the optical axis). Ideally speaking, no light would pass through the extension part, and the actual structure and shape of the extension part is not limited to this and may have other variations. For the reason of simplicity, the extension part is not illustrated in the following examples. More, precisely, the method for determining the surface shapes or the region in a vicinity of the optical axis, the region in a vicinity of its circular periphery and other regions is described in the following paragraphs:

1. FIG. 1 is a radial cross-sectional view of a lens element. Before determining boundaries of those aforesaid portions, two referential points should be defined first, middle point and conversion point. The middle point of a surface of a lens element is a point of intersection of that surface and the optical axis. The conversion point is a point on a surface of a lens element, where the tangent line of that point is perpendicular to the optical axis. Additionally, if multiple conversion points appear on one single surface, then these conversion points are sequentially named along the radial direction of the surface with numbers starting from the first conversion point. For instance, the first conversion point (closest one to the optical axis), the second conversion point, and the $N^{th}$ conversion point (farthest one to the optical axis within the scope of the clear aperture of the surface). The portion of a surface of the lens element between the middle point and the first conversion point is defined as the portion in a vicinity of the optical axis. The portion located radially outside of the $N^{th}$ conversion point (but still within the scope of the clear aperture) is defined as the portion in a vicinity of a periphery of the lens element. In some embodiments, there are other portions existing between the portion in a vicinity of the optical axis and the portion in a vicinity of a periphery of the lens element; the numbers of portions depend on the numbers of the conversion point(s). In addition, the radius of the clear aperture (or a so-called effective radius) of a surface is defined as the radial distance from the optical axis I to a point of intersection of the marginal ray Lm and the surface of the lens element.

2. Referring to FIG. 2, determining the shape of a portion is convex or concave depends on whether a collimated ray passing through that portion converges or diverges. That is, while applying a collimated ray to a portion to be determined in terms of shape, the collimated ray passing through that portion will be bended and the ray itself or its extension line will eventually meet the optical axis. The shape of that portion can be determined by whether the ray or its extension line meets (intersects) the optical axis (focal point) at the object-side or image-side. For instance, if the ray itself intersects the optical axis at the image side of the lens element after passing through a portion, i.e. the focal point of this ray is at the image side (see point R in FIG. 2), the portion will be determined as having a convex shape. On the contrary, if the ray diverges after passing through a portion, the extension line of the ray intersects the optical axis at the object side of the lens element, i.e. the focal point of the ray is at the object side (see point M in FIG. 2), that portion will be determined as having a concave shape. Therefore, referring to FIG. 2, the portion between the middle point and the first conversion point has a convex shape, the portion located radially outside of the first conversion point has a concave shape, and the first conversion point is the point where the portion having a convex shape changes to the portion having a concave shape, namely the border of two adjacent portions. Alternatively, there is another common way for a person with ordinary skill in the art to tell whether a portion in a vicinity of the optical axis has a convex or concave shape by referring to the sign of an "R" value, which is the (paraxial) radius of curvature of a lens surface. The R value is commonly used in conventional optical design software such as Zemax and CodeV. The R value usually appears in the lens data sheet in the software. For an object-side surface, positive R means that the object-side surface is convex, and negative R means that the object-side surface is concave. Conversely, for an image-side surface, positive R means that the image-side surface is concave, and negative R means that the image-side surface is convex. The result found by using this method should be consistent as by using the other way mentioned above, which determines surface shapes by referring to whether the focal point of a collimated ray is at the object side or the image side.

3. For none conversion point cases, the portion in a vicinity of the optical axis is defined as the portion between 0~50% of the effective radius (radius of the clear aperture) of the surface, whereas the portion in a vicinity of a periphery of the lens element is defined as the portion between 50~100% of effective radius (radius of the clear aperture) of the surface.

Referring to the first example depicted in FIG. 3, only one conversion point, namely a first conversion point, appears within the clear aperture of the image-side surface of the lens element. Portion I is a portion in a vicinity of the optical axis, and portion II is a portion in a vicinity of a periphery of the lens element. The portion in a vicinity of the optical axis is determined as having a concave surface due to the R value at the image-side surface of the lens element is positive. The shape of the portion in a vicinity of a periphery of the lens element is different from that of the radially inner adjacent portion, i.e. the shape of the portion in a vicinity of a periphery of the lens element is different from the shape of the portion in a vicinity of the optical axis; the portion in a vicinity of a periphery of the lens element has a convex shape.

Referring to the second example depicted in FIG. 4, a first conversion point and a second conversion point exist on the object-side surface (within the clear aperture) of a lens element. In which portion I is the portion in a vicinity of the optical axis, and portion III is the portion in a vicinity of a periphery of the lens element. The portion in a vicinity of the optical axis has a convex shape because the R value at the object-side surface of the lens element is positive. The portion in a vicinity of a periphery of the lens element (portion III) has a convex shape. What is more, there is another portion having a concave shape existing between the first and second conversion point (portion II).

Referring to a third example depicted in FIG. 5, no conversion point exists on the object-side surface of the lens element. In this case, the portion between 0~50% of the effective radius (radius of the clear aperture) is determined as the portion in a vicinity of the optical axis, and the portion between 50~100% of the effective radius is determined as the portion in a vicinity of a periphery of the lens element. The portion in a vicinity of the optical axis of the object-side surface of the lens element is determined as having a convex shape due to its positive R value, and the portion in a vicinity of a periphery of the lens element is determined as having a convex shape as well.

As shown in FIG. 6, the optical imaging lens set 1 of six lens elements of the present invention, sequentially located from an object side 2 (where an object is located) to an image side 3 along an optical axis 4, has an aperture stop (ape. stop) 80, a first lens element 10, a second lens element 20, a third lens element 30, a fourth lens element 40, a fifth lens element 50, a sixth lens element 60, a filter 70 and an image plane 71. Generally speaking, the first lens element 10, the second lens element 20, the third lens element 30, the fourth lens element 40, the fifth lens element 50 and the sixth lens element 60 may be made of a transparent plastic material but the present invention is not limited to this and each has an appropriate refractive power. There are exclusively six lens elements, which means the first lens element 10, the second lens element 20, the third lens element 30, the fourth lens element 40, the fifth lens element 50 and the sixth lens element 60, with refractive power in the optical imaging lens set 1 of the present invention. The optical axis 4 is the optical axis of the entire optical imaging lens set 1, and the optical axis of each of the lens elements coincides with the optical axis of the optical imaging lens set 1.

Furthermore, the optical imaging lens set 1 includes an aperture stop (ape. stop) 80 disposed in an appropriate position. In FIG. 6, the aperture stop 80 is disposed between the object side 2 and the first lens element 10. When light emitted or reflected by an object (not shown) which is located at the object side 2 enters the optical imaging lens set 1 of the present invention, it forms a clear and sharp image on the image plane 71 at the image side 3 after passing through the aperture stop 80, the first lens element 10, the second lens element 20, the third lens element 30, the fourth lens element 40, the fifth lens element 50, the sixth lens element 60 and the filter 70. In one embodiments of the present invention, the optional filter 70 may be a filter of various suitable functions, for example, the filter 70 may be an infrared cut filter (IR cut filter), placed between the sixth lens element 60 and the image plane 71. The filter 70 may be made of glass.

Each lens element in the optical imaging lens set 1 of the present invention has an object-side surface facing toward the object side 2 as well as an image-side surface facing toward the image side 3. For example, the first lens element 10 has a first object-side surface 11 and a first image-side surface 12; the second lens element 20 has a second object-side surface 21 and a second image-side surface 22; the third lens element 30 has a third object-side surface 31 and a third image-side surface 32; the fourth lens element 40 has a fourth object-side surface 41 and a fourth image-side surface 42; the fifth lens element 50 has a fifth object-side surface 51 and a fifth image-side surface 52; the sixth lens element 60 has a sixth object-side surface 61 and a sixth image-side surface 62. In addition, each object-side surface and image-side surface in the optical imaging lens set 1 of the present invention has a part (or portion) in a vicinity of its circular periphery (circular periphery part) away from the optical axis 4 as well as a part in a vicinity of the optical axis (optical axis part) close to the optical axis 4.

Each lens element in the optical imaging lens set 1 of the present invention further has a central thickness on the optical axis 4. For example, the first lens element 10 has a first lens element thickness $T_1$, the second lens element 20 has a second lens element thickness $T_2$, the third lens element 30 has a third lens element thickness $T_3$, the fourth lens element 40 has a fourth lens element thickness $T_4$, the fifth lens element 50 has a fifth lens element thickness $T_5$, the sixth lens element 60 has a sixth lens element thickness $T_6$. Therefore, the total thickness of all the lens elements in the optical imaging lens set 1 along the optical axis 4 is $ALT=T_1+T_2+T_3+T_4+T_5+T_6$.

In addition, between two adjacent lens elements in the optical imaging lens set 1 of the present invention there is an air gap along the optical axis 4. For example, an air gap $AG_{12}$ is disposed between the first lens element 10 and the second lens element 20, an air gap $AG_{23}$ is disposed between the second lens element 20 and the third lens element 30, an air gap $AG_{34}$ is disposed between the third lens element 30 and the fourth lens element 40, an air gap $AG_{45}$ is disposed between the fourth lens element 40 and the fifth lens element 50 as well as an air gap $AG_{56}$ is disposed between the fifth lens element 50 and the sixth lens element 60. Therefore, the sum of total five air gaps between adjacent lens elements from the first lens element 10 to the sixth lens element 60 along the optical axis 4 is $AAG=AG_{12}+AG_{23}+AG_{34}+AG_{45}+AG_{56}$.

In addition, the distance between the first object-side surface 11 of the first lens element 10 to the image plane 71, namely the total length of the optical imaging lens set along the optical axis 4 is TTL; the effective focal length of the optical imaging lens set is EFL; the distance between the sixth image-side surface 62 of the sixth lens element 60 to the image plane 71 along the optical axis 4 is BFL.

Furthermore, the focal length of the first lens element 10 is f1; the focal length of the second lens element 20 is f2; the focal length of the third lens element 30 is f3; the focal length of the fourth lens element 40 is f4; the focal length of the fifth lens element 50 is f5; the focal length of the sixth lens element 60 is f6; the refractive index of the first lens element 10 is n1; the refractive index of the second lens element 20 is n2; the refractive index of the third lens element 30 is n3; the refractive index of the fourth lens element 40 is n4; the refractive index of the fifth lens element 50 is n5; the refractive index of the sixth lens element 60 is n6; the Abbe number of the first lens element 10 is υ1; the Abbe number of the second lens element 20 is υ2; the Abbe number of the third lens element 30 is υ3; and the Abbe number of the fourth lens element 40 is υ4; the Abbe number of the fifth lens element 50 is υ5; and the Abbe number of the sixth lens element 60 is υ6.

First Example

Please refer to FIG. 6 which illustrates the first example of the optical imaging lens set 1 of the present invention. Please refer to FIG. 7A for the longitudinal spherical aberration on the image plane 71 of the first example; please refer to FIG. 7B for the astigmatic field aberration on the sagittal direction; please refer to FIG. 7C for the astigmatic field aberration on the tangential direction, and please refer to FIG. 7D for the distortion aberration. The Y axis of the spherical aberration in each example is "field of view" for 1.0. The Y axis of the astigmatic field and the distortion in each example stand for "Half Field of View (HFOV)", HFOV stands for the half field of view which is half of the field of view of the entire optical lens element system. The Y axis of the astigmatic field and the distortion in each example stands for "image height", which is 2.3 mm.

The optical imaging lens set 1 of the first example has six lens elements 10 to 60 with refractive power. The optical imaging lens set 1 also has an aperture stop 80, a filter 70, and an image plane 71. The aperture stop 80 is provided between the object side 2 and the first lens element 10. The filter 70 may be used for preventing specific wavelength light (such as the infrared light) reaching the image plane to adversely affect the imaging quality.

The first lens element 10 has positive refractive power. The first object-side surface 11 facing toward the object side 2 has a convex part 13 in the vicinity of the optical axis and a convex part 14 in a vicinity of its circular periphery. The first image-side surface 12 facing toward the image side 3 has a convex part 16 in the vicinity of the optical axis and a convex part 17 in a vicinity of its circular periphery. Besides, both the first object-side surface 11 and the first image-side 12 of the first lens element 10 are aspherical surfaces.

The second lens element 20 has negative refractive power. The second object-side concave surface 21 facing toward the object side 2 has a convex part 23 in the vicinity of the optical axis and a concave part 24 in a vicinity of its circular periphery. The second image-side surface 22 facing toward the image side 3 has a concave part 26 in the vicinity of the optical axis and a convex part 27 in a vicinity of its circular periphery. Both the second object-side surface 21 and the second image-side 22 of the second lens element 20 are aspherical surfaces.

The third lens element 30 has positive refractive power. The third object-side surface 31 facing toward the object side 2 has a concave part 33 in the vicinity of the optical axis and a convex part 34 in a vicinity of its circular periphery. The third image-side surface 32 facing toward the image side 3 has a convex part 36 in the vicinity of the optical axis and a concave part 37 in a vicinity of its circular periphery. Both the third object-side surface 31 and the third image-side 32 of the third lens element 30 are aspherical surfaces.

The fourth lens element 40 has negative refractive power. The fourth object-side surface 41 facing toward the object side 2 has a concave part 43 in the vicinity of the optical axis and a concave part 44 in a vicinity of its circular periphery. The fourth image-side surface 42 facing toward the image side 3 has a convex part 46 in the vicinity of the optical axis and a convex part 47 in a vicinity of its circular periphery. Both the fourth object-side surface 41 and the fourth image-side 42 of the fourth lens element 40 are aspherical surfaces.

The fifth lens element 50 has positive refractive power. The fifth object-side surface 51 facing toward the object side 2 has a convex part 53 in the vicinity of the optical axis and a concave part 54 in a vicinity of its circular periphery. The fifth image-side surface 52 facing toward the image side 3 has a convex part 56 in the vicinity of the optical axis and a convex part 57 in a vicinity of its circular periphery. Both the fifth object-side surface 51 and the fifth image-side 52 of the fifth lens element 50 are aspherical surfaces.

The sixth lens element 60 has negative refractive power. The sixth object-side surface 61 facing toward the object side 2 has a concave part 63 in the vicinity of the optical axis and a convex part 64 in a vicinity of its circular periphery. The sixth image-side surface 62 facing toward the image side 3 has a concave part 66 in the vicinity of the optical axis and a convex part 67 in a vicinity of its circular periphery. Both the sixth object-side surface 61 and the sixth image-side 62 of the sixth lens element 60 are aspherical surfaces. The filter 70 may be disposed between the sixth image-side 62 of the sixth lens element 60 and the image plane 71.

In the first lens element 10, the second lens element 20, the third lens element 30, the fourth lens element 40, the fifth lens element 50 and the sixth lens element 60 of the optical imaging lens element 1 of the present invention, the object-side surfaces 11/21/31/41/51/61 and image-side surfaces 12/22/32/42/52/62 are all aspherical. These aspheric coefficients are defined according to the following formula:

$$Z(Y) = \frac{Y^2}{R} \bigg/ \left(1 + \sqrt{1 - (1+K)\frac{Y^2}{R^2}}\right) + \sum_{i=1}^{n} a_{2i} \times Y^{2i}$$

In which:

R represents the curvature radius of the lens element surface;

Z represents the depth of an aspherical surface (the perpendicular distance between the point of the aspherical surface at a distance Y from the optical axis and the tangent plane of the vertex on the optical axis of the aspherical surface);

Y represents a vertical distance from a point on the aspherical surface to the optical axis;

K is a conic constant; $a_{2i}$ is the aspheric coefficient of the 2i order.

The optical data of the first example of the optical imaging lens set 1 are shown in FIG. 26 while the aspheric surface data are shown in FIG. 27. In the present examples of the optical imaging lens set, the f-number of the entire optical lens element system is Fno, HFOV stands for the half field of view which is half of the field of view of the entire optical lens element system, and the unit for the curvature radius, the thickness and the focal length is in millimeters (mm). The image height is 2.3 mm. HFOV is 39.63 degrees.

In FIG. 7A for the longitudinal spherical aberration of the first example, the distances amongst the three representing wavelengths are pretty close to one another. It suggests that light of each wavelength of different heights meets around the imaging point. The inclination of each curve suggests that light of different heights meets within a range ±0.01 mm so the spherical aberration of different wavelength in the first example is greatly improved. In addition, the distances amongst light of the three representing different wavelengths are small enough. It suggests that light of different wavelengths meets at a small spot so the field aberration is greatly improved.

In FIGS. 7B and 7C of astigmatic field aberration, light of the three representing different wavelengths in the entire field of view focuses on a spot within ±0.1 mm so it suggests that the optical imaging lens set of the first example is able to effectively eliminate the aberrations. In addition, the distances amongst light of the three representing different wavelengths are small enough. It suggests that the optical dispersion on the optical axis 4 is greatly improved. The distortion aberration of FIG. 7D reveals that the distortion aberration of the first example is within a range of ±1%, which suggests the distortion aberration of the first example meets the demands of the imaging quality of an optical system. Compared with the current optical lens system, the first example shows less aberration/distortion and better imaging quality with a system length not greater than 4.0 mm. The demonstrated first example may maintain a good optical performance and reduced lens set length to realize a smaller product design.

Some important ratios of the first example are as follows:

$AAG/T_2=2.767$
$AG_{34}/(AG_{12}+AG_{45})=0.416$
$ALT/AG_{23}=8.564$
$T_5/(AG_{12}+AG_{45})=1.961$
$(AG_{12}+AG_{45})/AG_{23}=0.780$
$ALT/AG_{34}=26.399$
$T_5/AG_{34}=4.713$
$T_3/T_5=0.967$
$ALT/(AG_{12}+AG_{45})=10.983$
$T_1/T_3=1.376$
$T_1/AG_{34}=6.272$
$T_3/T_6=0.895$
$AAG/T_5=1.691$
$T_1/AAG=0.787$
$T_3/(AG_{12}+AG_{45})=1.897$
$T_1/AG_{23}\ 2.035$

Second Example

Please refer to FIG. 8 which illustrates the second example of the optical imaging lens set 1 of the present invention. It is noted that from the second example to the following examples, in order to simplify the figures, only the components different from what the first example has, and the basic lens elements will be labeled in figures. Other components that are the same as what the first example has, such as the object-side surface, the image-side surface, the part in a vicinity of the optical axis and the part in a vicinity of its circular periphery will be omitted in the following examples. Please refer to FIG. 9A for the longitudinal spherical aberration on the image plane 71 of the second example, please refer to FIG. 9B for the astigmatic aberration on the sagittal direction, please refer to FIG. 9C for the astigmatic aberration on the tangential direction, and please refer to FIG. 9D for the distortion aberration. The components in the second example are similar to those in the first example, but the optical data such as the curvature radius, the refractive power, the lens thickness, the lens focal length, the aspheric surface or the back focal length in this example are different from the optical data in the first example, and in this example, the fourth lens element 40 has positive refractive power, the fifth lens element 50 has negative refractive power, the fifth image-side surface 52 has a concave part 56' in the vicinity of the optical axis and a convex part 57 in a vicinity of its circular periphery, the sixth object-side surface 61 has a convex part 63' in the vicinity of the optical axis and a concave part 64' in a vicinity of its circular periphery. The optical data of the second example of the optical imaging lens set are shown in FIG. 28 while the aspheric surface data are shown in FIG. 29. The image height is 2.3 mm. HFOV is 39.05 degrees. Some important ratios of the second example are as follows:

$AAG/T_2=2.501$
$AG_{34}/(AG_{12}+AG_{45})=0.492$
$ALT/AG_{23}=11.792$
$T_5/(AG_{12}+AG_{45})=2.981$
$(AG_{12}+AG_{45})/AG_{23}=0.727$
$ALT/AG_{34}=32.981$
$T_5/AG_{34}=6.064$
$T_3/T_5=0.831$
$ALT/AG_{12}+AG_{45})=16.213$
$T_1/T_3=1.390$
$T_1/AG_{34}=6.998$
$T_3/T_6=1.331$
$AAG/T_5=1.322$
$T_1/AAG=0.873$ $T_3/(AG_{12}+AG_{45})=2.476$
$T_1/AG_{23}$ 2.502

Third Example

Figure 10:
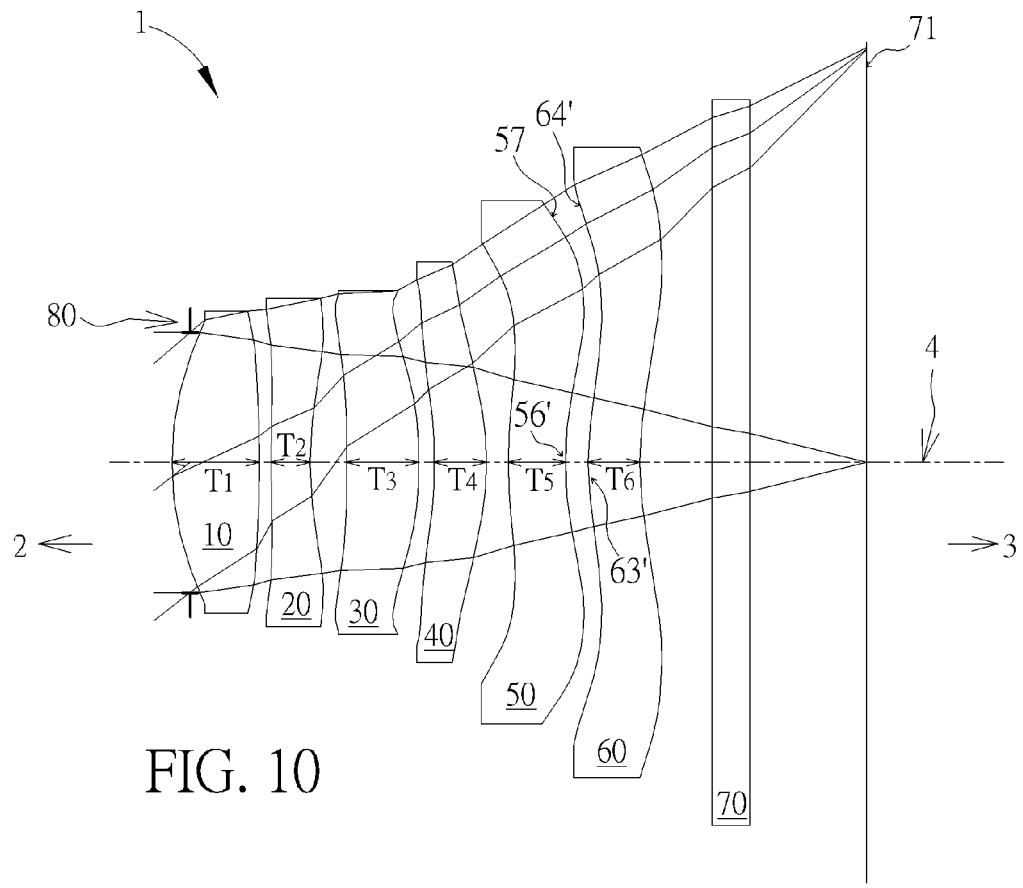
FIG. 10 illustrates a third example of the optical imaging lens set of six lens elements of the present invention.
Figures 11A, 11B, 11C, 11D:
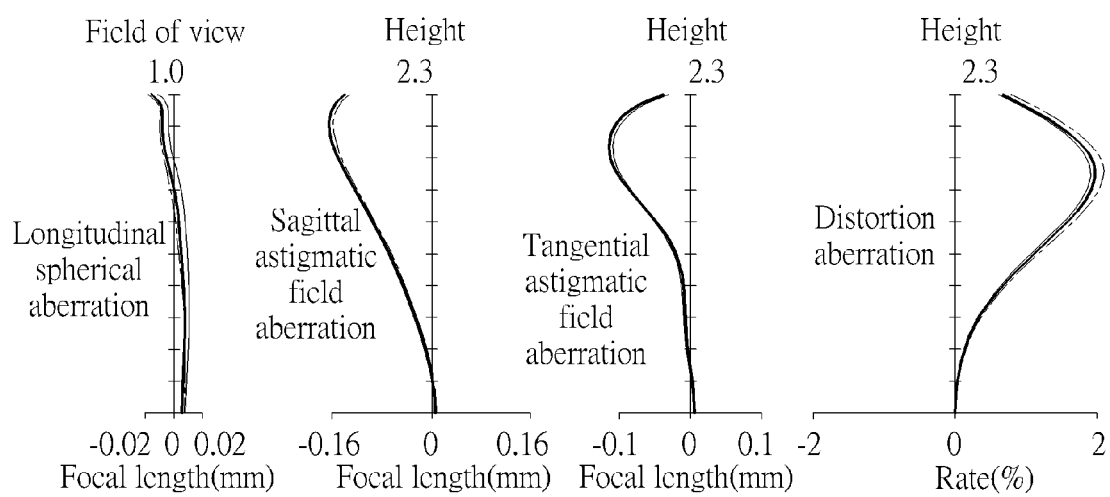
FIG. 11A illustrates the longitudinal spherical aberration on the image plane of the third example.
FIG. 11B illustrates the astigmatic aberration on the sagittal direction of the third example.
FIG. 11C illustrates the astigmatic aberration on the tangential direction of the third example.
FIG. 11D illustrates the distortion aberration of the third example.

Please refer to FIG. 10 which illustrates the third example of the optical imaging lens set 1 of the present invention. Please refer to FIG. 11A for the longitudinal spherical aberration on the image plane 71 of the third example; please refer to FIG. 11B for the astigmatic aberration on the sagittal direction; please refer to FIG. 11C for the astigmatic aberration on the tangential direction, and please refer to FIG. 11D for the distortion aberration. The components in the third example are similar to those in the first example, but the optical data such as the curvature radius, the refractive power, the lens thickness, the lens focal length, the aspheric surface or the back focal length in this example are different from the optical data in the first example, and in this example, the fourth lens element 40 has positive refractive power, the fifth lens element 50 has negative refractive power, the fifth image-side surface 52 has a concave part 56' in the vicinity of the optical axis and a convex part 57 in a vicinity of its circular periphery, the sixth lens element 60 has positive refractive power, the sixth object-side surface 61 has a convex part 63' in the vicinity of the optical axis and a concave part 64' in a vicinity of its circular periphery. The optical data of the third example of the optical imaging lens set are shown in FIG. 30 while the aspheric surface data are shown in FIG. 31. The image height is 2.3 mm. HFOV is 38.31 degrees. Some important ratios of the third example are as follows:
$AAG/T_2=2.869$
$AG_{34}/(AG_{12}+AG_{45})=0.453$
$ALT/AG_{23}=9.614$
$T_5/(AG_{12}+AG_{45})=1.694$
$(AG_{12}+AG_{45})/AG_{23}=0.914$
$ALT/AG_{34}=23.240$
$T_5/AG_{34}=3.741$
$T_3/T_5=1.250$
$ALT/(AG_{12}+AG_{45})=10.523$
$T_1/T_3=1.207$
$T_1/AG_{34}=5.641$
$T_3/T_6=1.402$
$AAG/T_5=1.899$
$T_1/AAG=0.794$
$T_3/(AG_{12}+AG_{45})=2.117$
$T_1/AG_{23}$ 2.334

Fourth Example

Figure 12:
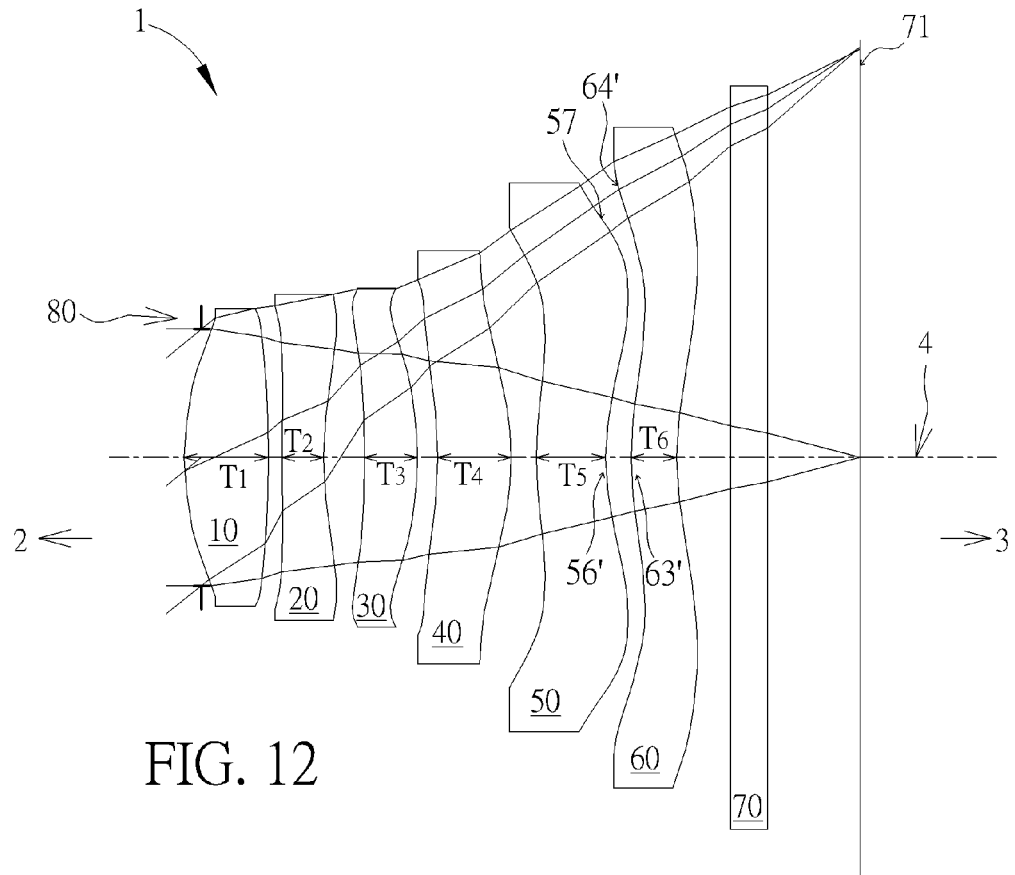
FIG. 12 illustrates a fourth example of the optical imaging lens set of six lens elements of the present invention.
Figures 13A, 13B, 13C, 13D:
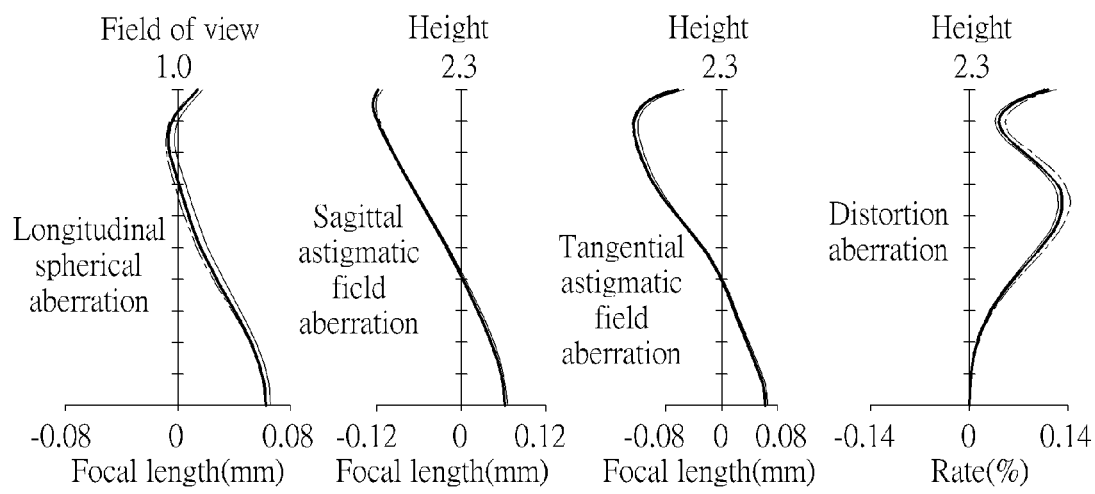
FIG. 13A illustrates the longitudinal spherical aberration on the image plane of the fourth example.
FIG. 13B illustrates the astigmatic aberration on the sagittal direction of the fourth example.
FIG. 13C illustrates the astigmatic aberration on the tangential direction of the fourth example.
FIG. 13D illustrates the distortion aberration of the fourth example.

Please refer to FIG. 12 which illustrates the fourth example of the optical imaging lens set 1 of the present invention. Please refer to FIG. 13A for the longitudinal spherical aberration on the image plane 71 of the fourth example; please refer to FIG. 13B for the astigmatic aberration on the sagittal direction; please refer to FIG. 13C for the astigmatic aberration on the tangential direction, and please refer to FIG. 13D for the distortion aberration. The components in the fourth example are similar to those in the first example, but the optical data such as the curvature radius, the refractive power, the lens thickness, the lens focal length, the aspheric surface or the back focal length in this example are different from the optical data in the first example, and in this example, the fourth lens element 40 has positive refractive power, the fifth lens element 50 has negative refractive power, the fifth image-side surface 52 has a concave part 56' in the vicinity of the optical axis and a convex part 57 in a vicinity of its circular periphery, the sixth object-side surface 61 has a convex part 63' in the vicinity of the optical axis and a concave part 64' in a vicinity of its circular periphery. The optical data of the fourth example of the optical imaging lens set are shown in FIG. 32 while the aspheric surface data are shown in FIG. 33. The image height is 2.3 mm. HFOV is 38.92 degrees. Some important ratios of the fourth example are as follows:
$AAG/T_2=3.049$
$AG_{34}/(AG_{12}+AG_{45})=0.524$
$ALT/AG_{23}=8.945$
$T_5/(AG_{12}+AG_{45})=1.763$
$(AG_{12}+AG_{45})/AG_{23}=0.955$
$ALT/AG_{34}=17.878$
$T_5/AG_{34}=3.364$
$T_3/T_5=0.768$
$ALT/(AG_{12}+AG_{45})=9.369$
$T_1/T_3=1.588$
$T_1/AG_{34}=4.100$
$T_3/T_6=1.162$
$AAG/T_5=1.839$
$T_1/AAG=0.663$
$T_3/(AG_{12}+AG_{45})=1.353$
$T_1/AG_{23}$ 2.051

Fifth Example

Figure 14:
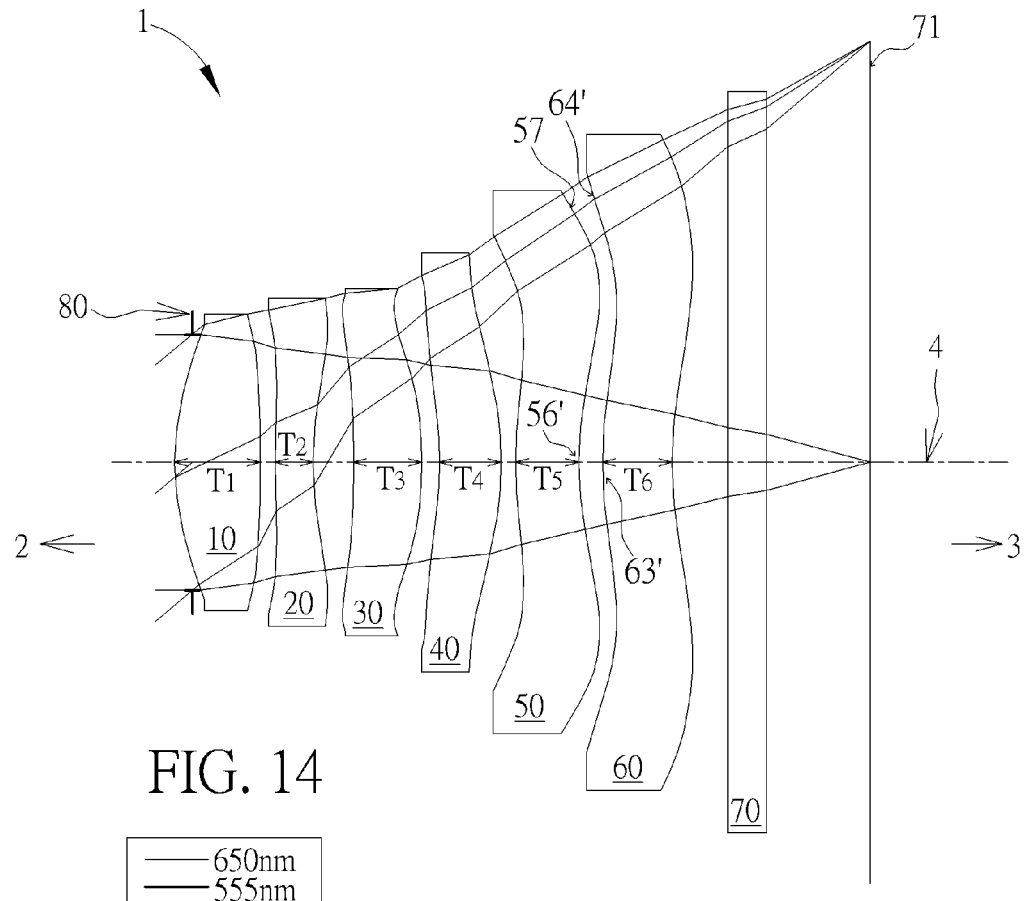
FIG. 14 illustrates a fifth example of the optical imaging lens set of six lens elements of the present invention.
Figures 15A, 15B, 15C, 15D:
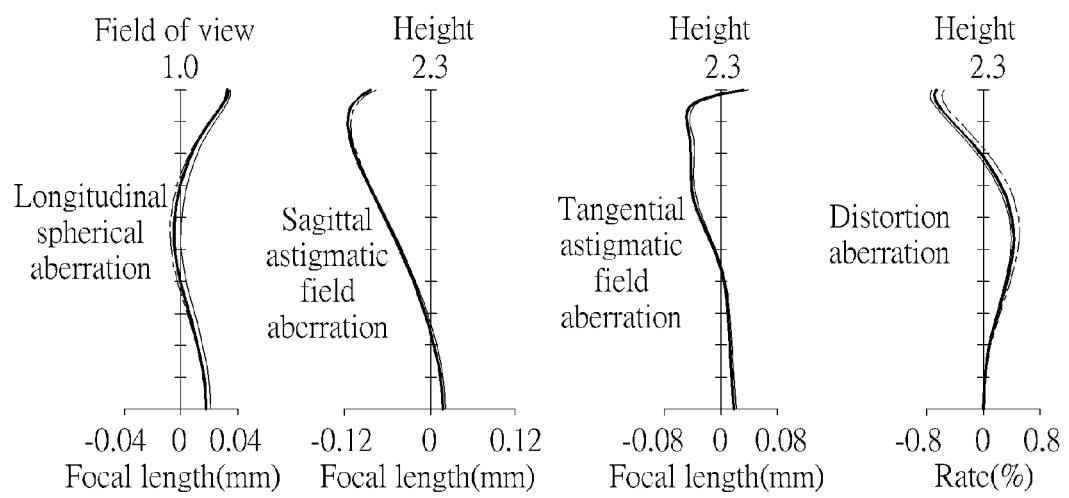
FIG. 15A illustrates the longitudinal spherical aberration on the image plane of the fifth example.
FIG. 15B illustrates the astigmatic aberration on the sagittal direction of the fifth example.
FIG. 15C illustrates the astigmatic aberration on the tangential direction of the fifth example.
FIG. 15D illustrates the distortion aberration of the fifth example.

Please refer to FIG. 14 which illustrates the fifth example of the optical imaging lens set 1 of the present invention. Please refer to FIG. 15A for the longitudinal spherical aberration on the image plane 71 of the fifth example; please refer to FIG. 15B for the astigmatic aberration on the sagittal direction; please refer to FIG. 15C for the astigmatic aberration on the tangential direction, and please refer to FIG. 15D for the distortion aberration. The components in the fifth example are similar to those in the first example, but the optical data such as the curvature radius, the refractive power, the lens thickness, the lens focal length, the aspheric surface or the back focal length in this example are different from the optical data in the first example, and in this example, the fourth lens element 40 has positive refractive power, the fifth lens element 50 has negative refractive power, the fifth image-side surface 52 has a concave part 56' in the vicinity of the optical axis and a convex part 57 in a vicinity of its circular periphery, the sixth lens element 60 has positive refractive power, the sixth object-side surface 61 has a convex part 63' in the vicinity of the optical axis and a concave part 64' in a vicinity of its circular periphery. The optical data of the fifth example of the optical imaging lens set are shown in FIG. 34 while the aspheric surface data are shown in FIG. 35. The image height is 2.3 mm. HFOV is 39.97 degrees. Some important ratios of the fifth example are as follows:
$AAG/T_2=2.917$
$AG_{34}/(AG_{12}+AG_{45})=0.589$
$ALT/AG_{23}=9.519$
$T_5/(AG_{12}+AG_{45})=2.127$
$(AG_{12}+AG_{45})/AG_{23}=0.722$
$ALT/AG_{34}=22.392$
$T_5/AG_{34}=3.613$
$T_3/T_5=1.096$
$ALT/(AG_{12}+AG_{45})=13.183$
$T_1/T_3=1.254$
$T_1/AG_{34}=4.964$
$T_3/T_6=0.979$
$AAG/T_5=1.789$
$T_1/AAG=0.768$ $T_3/(AG_{12}+AG_{45})=2.331$
$T_1/AG_{23}$ 2.110

Sixth Example

Figure 16:
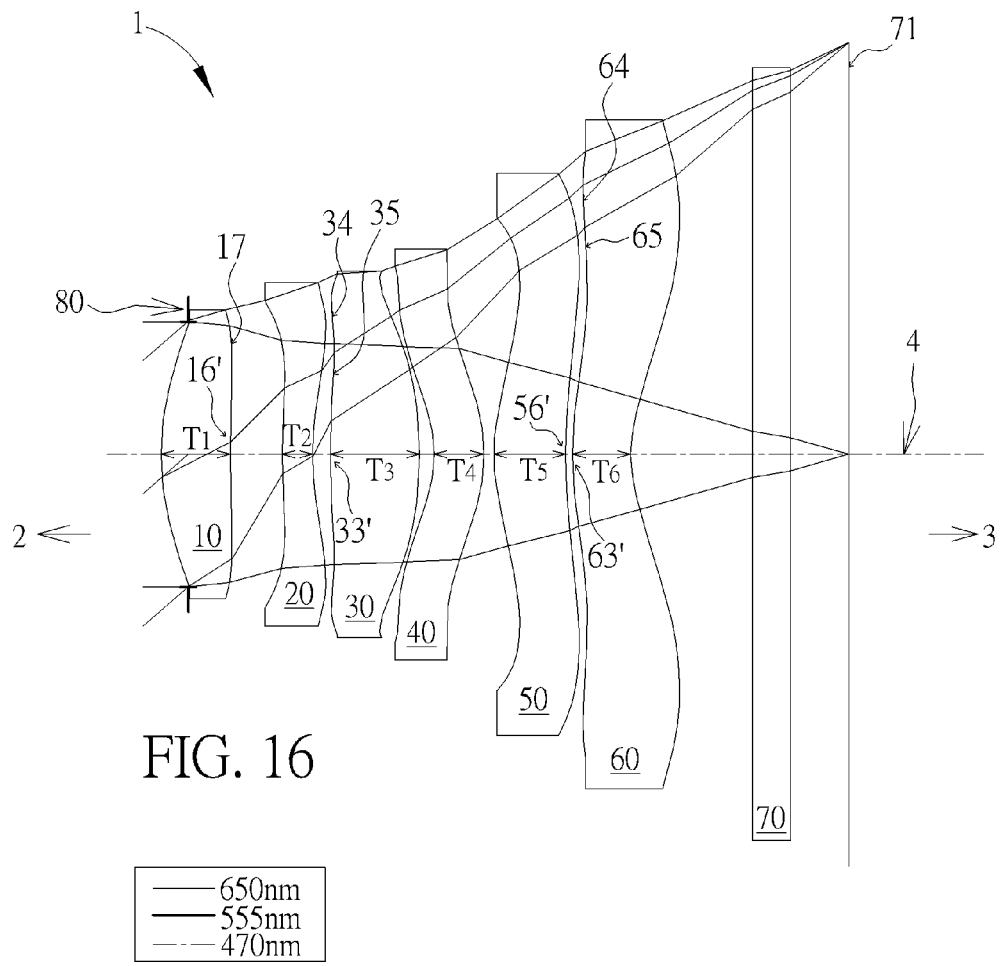
FIG. 16 illustrates a sixth example of the optical imaging lens set of six lens elements of the present invention.
Figure 17A:
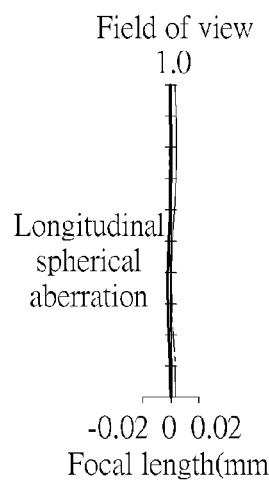
FIG. 17A illustrates the longitudinal spherical aberration on the image plane of the sixth example.
Figure 17B:
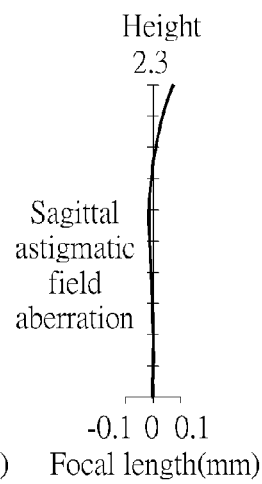
FIG. 17B illustrates the astigmatic aberration on the sagittal direction of the sixth example.
Figure 17C:
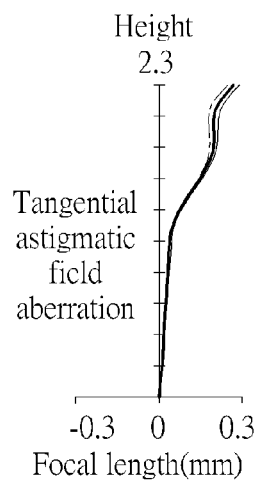
FIG. 17C illustrates the astigmatic aberration on the tangential direction of the sixth example.
Figure 17D:
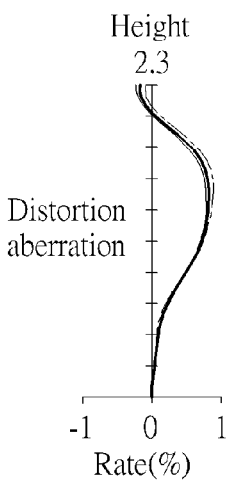
FIG. 17D illustrates the distortion aberration of the sixth example.

Please refer to FIG. 16 which illustrates the sixth example of the optical imaging lens set 1 of the present invention. Please refer to FIG. 17A for the longitudinal spherical aberration on the image plane 71 of the sixth example; please refer to FIG. 17B for the astigmatic aberration on the sagittal direction; please refer to FIG. 17C for the astigmatic aberration on the tangential direction, and please refer to FIG. 17D for the distortion aberration. The components in the sixth example are similar to those in the first example, but the optical data such as the curvature radius, the refractive power, the lens thickness, the lens focal length, the aspheric surface or the back focal length in this example are different from the optical data in the first example, and in this example, the first image-side surface 12 has a concave part 16' in the vicinity of the optical axis and a convex part 17 in a vicinity of its circular periphery, the third object-side surface 31 of the third lens element 30 has a convex part 33' in the vicinity of the optical axis, a convex part 34 in a vicinity of its circular periphery and a concave part 35 between the optical axis and the circular periphery part, the fifth image-side surface 52 has a concave part 56' in the vicinity of the optical axis and a convex part 57 in a vicinity of its circular periphery, the sixth object-side surface 61 has a convex part 63' in the vicinity of the optical axis, a convex part 64 in a vicinity of its circular periphery and a concave part 65 between the optical axis and the circular periphery part. The optical data of the sixth example of the optical imaging lens set are shown in FIG. 36 while the aspheric surface data are shown in FIG. 37. The image height is 2.3 mm. HFOV is 40.99 degrees. Some important ratios of the sixth example are as follows:

$AAG/T_2=3.310$
$AG_{34}/(AG_{12}+AG_{46})=0.237$
$ALT/AG_{23}=21.355$
$T_5/(AG_{12}+AG_{46})=1.140$
$(AG_{12}+AG_{46})/AG_{23}=3.645$
$ALT/AG_{34}=24.722$
$T_5/AG_{34}=4.809$
$T_3/T_5=1.243$
$ALT/(AG_{12}+AG_{46})=5.858$
$T_1/T_3=0.771$
$T_1/AG_{34}=4.611$
$T_3/T_6=1.520$
$AAG/T_5=1.420$
$T_1/AAG=0.675$
$T_3/(AG_{12}+AG_{45})=1.417$
$T_1/AG_{23}$ 3.983

Seventh Example

Figure 18:
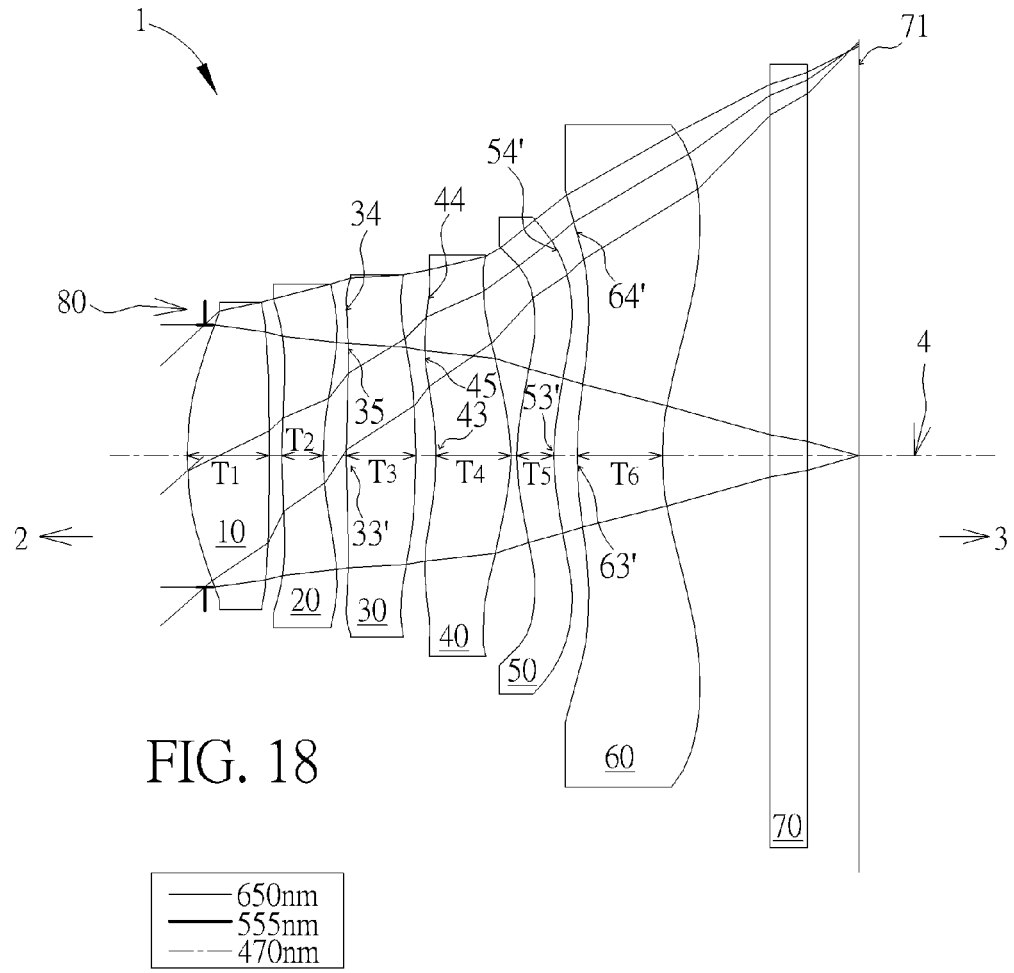
FIG. 18 illustrates a seventh example of the optical imaging lens set of six lens elements of the present invention.
Figures 19A, 19B, 19C, 19D:
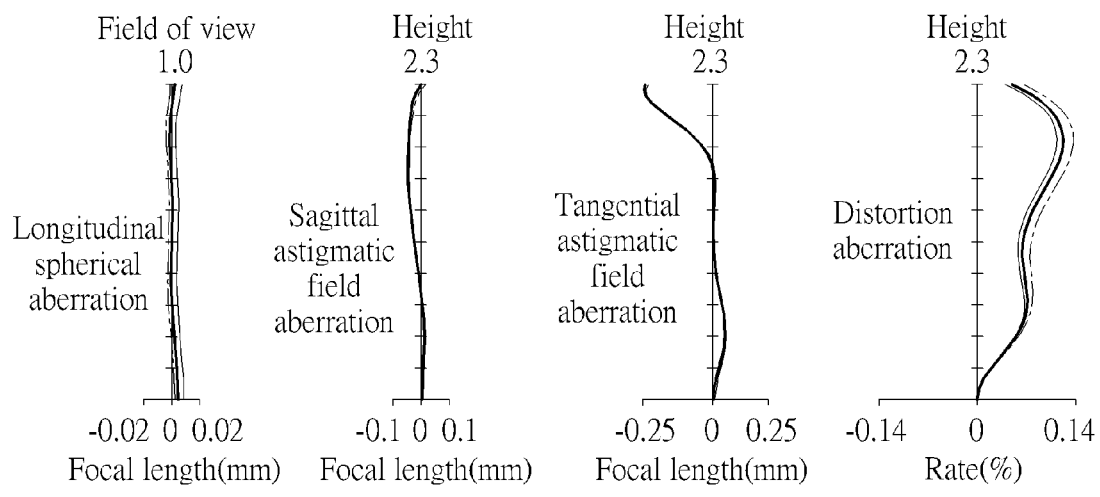
FIG. 19A illustrates the longitudinal spherical aberration on the image plane of the seventh example.
FIG. 19B illustrates the astigmatic aberration on the sagittal direction of the seventh example.
FIG. 19C illustrates the astigmatic aberration on the tangential direction of the seventh example.
FIG. 19D illustrates the distortion aberration of the seventh example.

Please refer to FIG. 18 which illustrates the seventh example of the optical imaging lens set 1 of the present invention. Please refer to FIG. 19A for the longitudinal spherical aberration on the image plane 71 of the seventh example; please refer to FIG. 19B for the astigmatic aberration on the sagittal direction; please refer to FIG. 19C for the astigmatic aberration on the tangential direction, and please refer to FIG. 19D for the distortion aberration. The components in the seventh example are similar to those in the first example, but the optical data such as the curvature radius, the refractive power, the lens thickness, the lens focal length, the aspheric surface or the back focal length in this example are different from the optical data in the first example, and in this example, the third object-side surface 31 of the third lens element 30 has a convex part 33' in the vicinity of the optical axis and a convex part 34 in a vicinity of its circular periphery and a concave part 35 between the optical axis and the circular periphery part, the fourth lens element 40 has negative refractive power, the fourth object-side surface 41 has a concave part 43 in the vicinity of the optical axis and a concave part 44 in a vicinity of its circular periphery and a convex part 45 between the optical axis and the circular periphery part, the fifth image-side surface 52 has a concave part 53' in the vicinity of the optical axis and a convex part 54' in a vicinity of its circular periphery, the sixth object-side surface 61 has a convex part 63' in the vicinity of the optical axis and a concave part 64' in a vicinity of its circular periphery. The optical data of the seventh example of the optical imaging lens set are shown in FIG. 38 while the aspheric surface data are shown in FIG. 39. The image height is 2.3 mm. HFOV is 40.99 degrees. Some important ratios of the seventh example are as follows:

$AAG/T_2=2.071$
$AG_{34}/(AG_{12}+AG_{45})=1.097$
$ALT/AG_{23}=16.775$
$T_5/(AG_{12}+AG_{45})=1.988$
$(AG_{12}+AG_{46})/AG_{23}=0.795$
$ALT/AG_{34}=19.229$
$T_5/AG_{34}=1.812$
$T_3/T_5=1.896$
$ALT/(AG_{12}+AG_{46})=21.095$
$T_1/T_3=1.176$
$T_1/AG_{34}=4.042$
$T_3/T_6=0.815$
$AAG/T_5=2.322$
$T_1/AAG=0.961$
$T_3/(AG_{12}+AG_{46})=3.769$
$T_1/AG_{23}$ 3.526

Eighth Example

Figure 20:
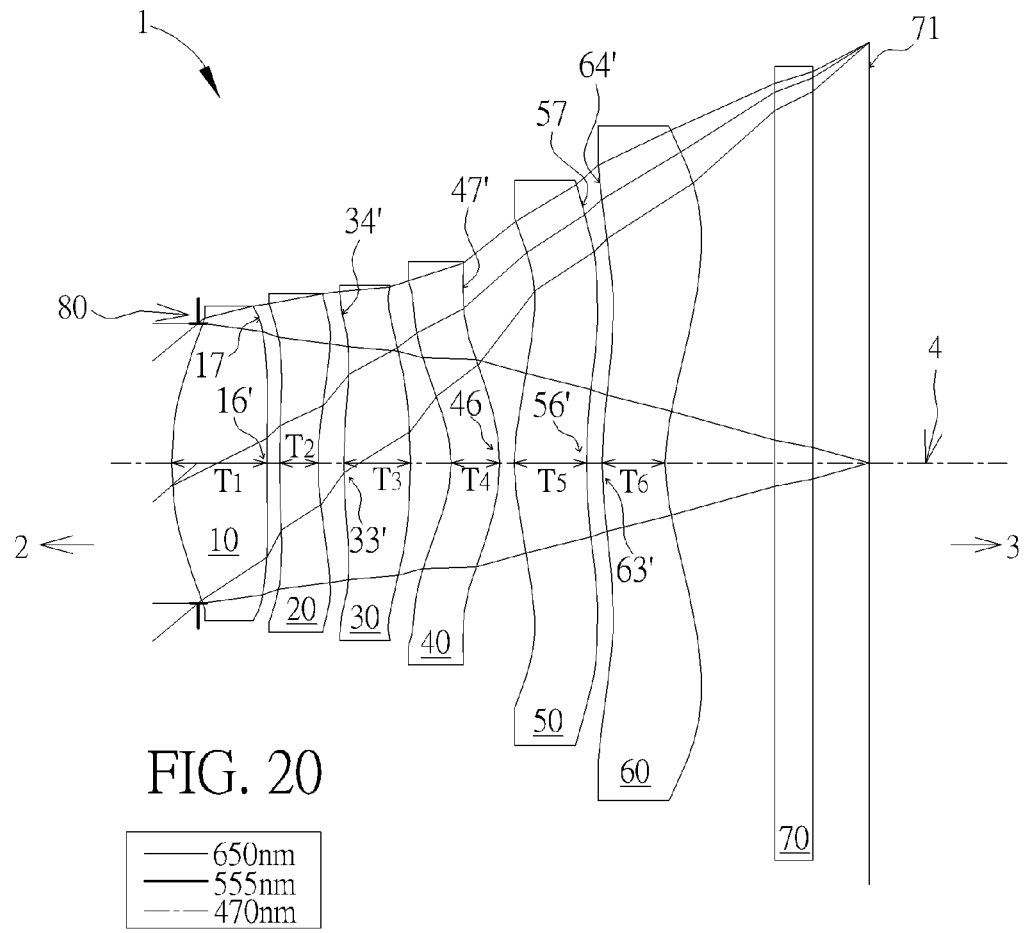
FIG. 20 illustrates an eighth example of the optical imaging lens set of six lens elements of the present invention.
Figures 21A, 21B, 21C, 21D:
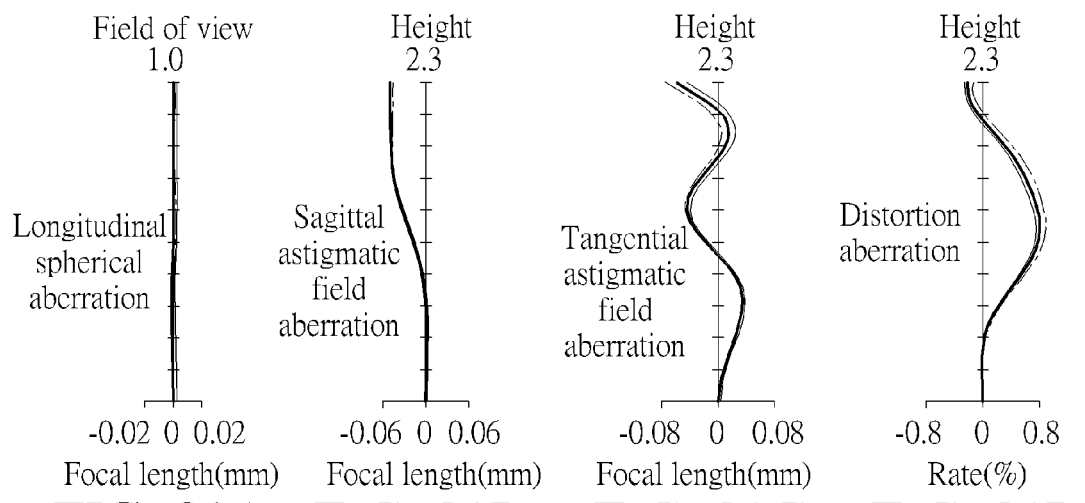
FIG. 21A illustrates the longitudinal spherical aberration on the image plane of the eighth example.
FIG. 21B illustrates the astigmatic aberration on the sagittal direction of the eighth example.
FIG. 21C illustrates the astigmatic aberration on the tangential direction of the eighth example.
FIG. 21D illustrates the distortion aberration of the eighth example.

Please refer to FIG. 20 which illustrates the eighth example of the optical imaging lens set 1 of the present invention. Please refer to FIG. 21A for the longitudinal spherical aberration on the image plane 71 of the eighth example; please refer to FIG. 21B for the astigmatic aberration on the sagittal direction; please refer to FIG. 21C for the astigmatic aberration on the tangential direction, and please refer to FIG. 21D for the distortion aberration. The components in the eighth example are similar to those in the first example, but the optical data such as the curvature radius, the refractive power, the lens thickness, the lens focal length, the aspheric surface or the back focal length in this example are different from the optical data in the first example, and in this example, the first image-side surface 12 has a concave part 16' in the vicinity of the optical axis and a convex part 17 in a vicinity of its circular periphery, the third object-side surface 31 of the third lens element 30 has a convex part 33' in the vicinity of the optical axis, a concave part 34' in a vicinity of its circular periphery, the fourth image-side surface 42 has a convex part 46 in the vicinity of the optical axis and a concave part 47' in a vicinity of its circular periphery, the fifth image-side surface 52 has a concave part 56' in the vicinity of the optical axis and a convex part 57 in a vicinity of its circular periphery, the eighth object-side surface 61 has a convex part 63' in the vicinity of the optical axis and a concave part 64' in a vicinity of its circular periphery. The optical data of the eighth example of the optical imaging lens set are shown in FIG. 40 while the aspheric surface data are shown in FIG. 41. The image height is 2.3 mm. HFOV is 40.00 degrees. Some important ratios of the eighth example are as follows:

$AAG/T_2=2.829$
$AG_{34}/(AG_{12}+AG_{46})=1.489$
$ALT/AG_{23}=14.842$
$T_5/(AG_{12}+AG_{46})=2.640$
$(AG_{12}+AG_{46})/AG_{23}=1.064$
$ALT/AG_{34}=9.372$
$T_5/AG_{34}=1.773$
$T_3/T_5=0.913$
$ALT/(AG_{12}+AG_{46})=13.954$
$T_1/T_3=1.437$
$T_1/AG_{34}=2.326$
$T_3/T_6=1.061$
$AAG/T_5=1.517$
$T_1/AAG=0.865$
$T_3/(AG_{12}+AG_{46})=2.410$
$T_1/AG_{23}\ 3.683$

Ninth Example

Figure 22:
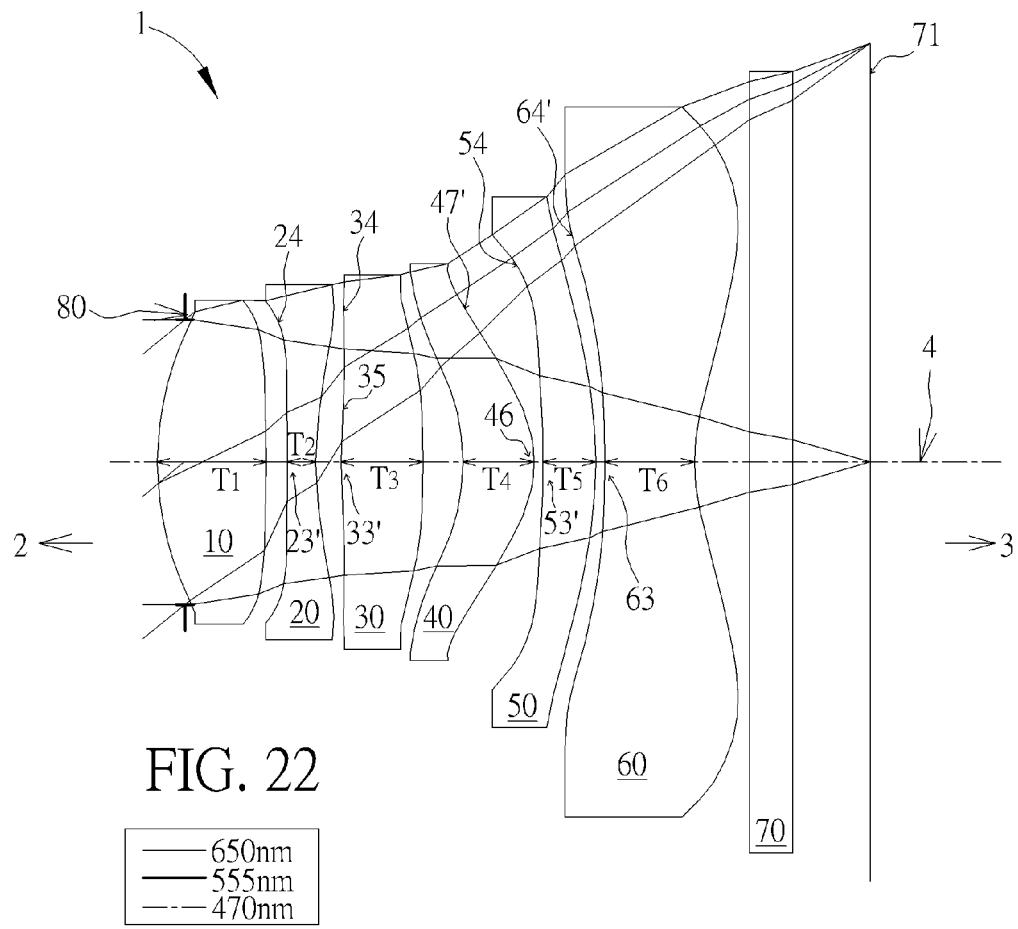
FIG. 22 illustrates a ninth example of the optical imaging lens set of six lens elements of the present invention.
Figures 23A, 23B, 23C, 23D:
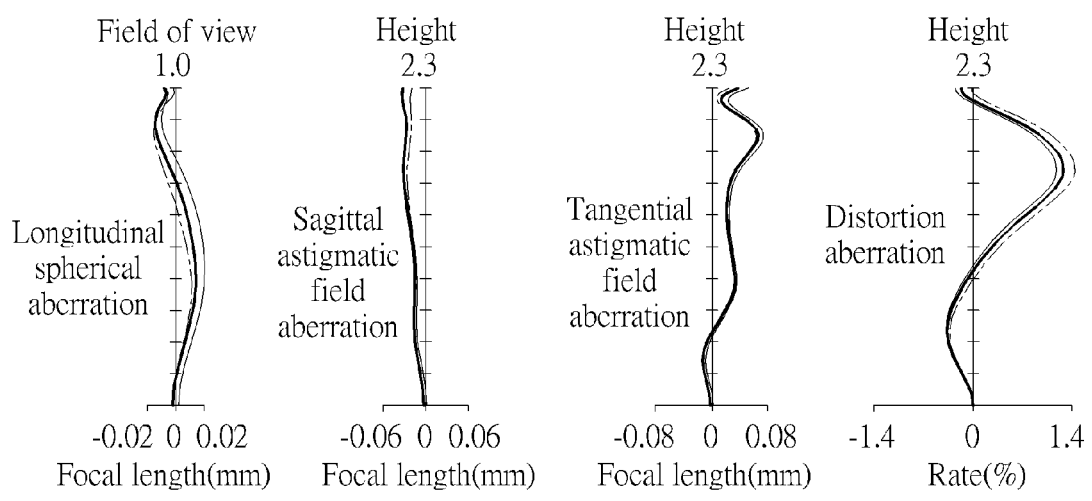
FIG. 23A illustrates the longitudinal spherical aberration on the image plane of the ninth example.
FIG. 23B illustrates the astigmatic aberration on the sagittal direction of the ninth example.
FIG. 23C illustrates the astigmatic aberration on the tangential direction of the ninth example.
FIG. 23D illustrates the distortion aberration of the ninth example.

Please refer to FIG. 22 which illustrates the ninth example of the optical imaging lens set 1 of the present invention. Please refer to FIG. 23A for the longitudinal spherical aberration on the image plane 71 of the ninth example; please refer to FIG. 23B for the astigmatic aberration on the sagittal direction; please refer to FIG. 23C for the astigmatic aberration on the tangential direction, and please refer to FIG. 23D for the distortion aberration. The components in the ninth example are similar to those in the first example, but the optical data such as the curvature radius, the refractive power, the lens thickness, the lens focal length, the aspheric surface or the back focal length in this example are different from the optical data in the first example, and in this example, the second object-side concave surface 21 has a concave part 23' in the vicinity of the optical axis and a concave part 24 in a vicinity of its circular periphery, the third object-side surface 31 of the third lens element 30 has a convex part 33' in the vicinity of the optical axis and a convex part 34 in a vicinity of its circular periphery and a concave part 35 between the optical axis and the circular periphery part, the fourth image-side surface 42 has a convex part 46 in the vicinity of the optical axis and a concave part 47' in a vicinity of its circular periphery, the fifth object-side surface 51 has a concave part 53' in the vicinity of the optical axis and a concave part 54 in a vicinity of its circular periphery, the sixth object-side surface 61 has a concave part 63 in the vicinity of the optical axis and a concave part 64' in a vicinity of its circular periphery. The optical data of the ninth example of the optical imaging lens set are shown in FIG. 42 while the aspheric surface data are shown in FIG. 43. The image height is 2.3 mm. HFOV is 40.00 degrees. Some important ratios of the ninth example are as follows:

$AAG/T_2=3.643$
$AG_{34}/(AG_{12}+AG_{45})=1.344$
$ALT/AG_{23}=17.102$
$T_5/(AG_{12}+AG_{45})=1.762$
$(AG_{12}+AG_{45})/AG_{23}=1.181$
$ALT/AG_{34}=10.769$
$T_5/AG_{34}=1.311$
$T_3/T_5=1.556$
$ALT/(AG_{12}+AG_{45})=14.476$
$T_1/T_3=1.332$
$T_1/AG_{34}=2.718$
$T_3/T_6=0.919$
$AAG/T_5=1.987$
$T_1/AAG=1.043$
$T_3/(AG_{12}+AG_{45})=2.742$
$T_1/AG_{23}\ 4.315$

Some important ratios in each example are shown in FIG. 44. The distance between the sixth image-side surface 62 of the sixth lens element 60 to the filter 70 along the optical axis 4 is G6F; the thickness of the filter 70 along the optical axis 4 is TF; the distance between the filter 70 to the image plane 71 along the optical axis 4 is GFI; the distance between the sixth image-side surface 62 of the sixth lens element 60 to the image plane 71 along the optical axis 4 is BFL. Therefore, BFL=G6F+TF+GFI.

In the light of the above examples, the inventors observe at least the following features:

1. The positive refractive power of the first lens element provides the positive refractive power for the entire optical imaging lens set 1. The negative refractive power of the second lens element helps correct the entire aberration of the optical system. The aperture stop is disposed in front of the first object-side surface to improve the imaging quality and to decrease the length of the entire optical imaging lens set.
2. The first object-side surface with a convex part in a vicinity of the optical axis and of its circular periphery helps collect the imaging light, the collective match of the first image-side surface with a convex part in a vicinity of its circular periphery, the second object-side surface with a concave part in the vicinity of its circular periphery, the third image-side surface with a concave part in a vicinity of its circular periphery, the fourth image-side surface with a convex part in the vicinity of the optical axis, the fifth object-side surface with a concave part in a vicinity of its circular periphery, the sixth image-side surface with a concave part in the vicinity of the optical axis and a convex part in a vicinity of its circular periphery enhances the imaging quality, to decrease the total length, to decrease the f-number and to enlarge the field of view of the optical system.

In addition, the inventors discover that there are some better ratio ranges for different data according to the above various important ratios. Better ratio ranges help the designers to design a better optical performance and an effectively reduce length of a practically possible optical imaging lens set. For example:

1. The ratio of $AAG/T_2$ is suggested to be less than or equal to 3.6, and preferably between 2.0~3.6.
2. The ratio of $AG_{34}/(AG_{12}+AG_{45})$ is suggested to be less than or equal to 1.5, and preferably between 0.2~1.5.
3. The ratio of $ALT/AG_{23}$ is suggested to be more than or equal to 8.5, and preferably between 8.5~25.0.
4. The ratio of $T_5/(AG_{12}+AG_{45})$ is suggested to be less than or equal to 3.0, and preferably between 0.8~3.0.
5. The ratio of $(AG_{12}+AG_{45})/AG_{23}$ is suggested to be more than or equal to 0.7, and preferably between 0.7~4.0.
6. The ratio of $ALT/AG_{34}$ is suggested to be more than or equal to 9.0, and preferably between 9.0~35.0.
7. The ratio of $T_5/AG_{34}$ is suggested to be more than or equal to 1.3, and preferably between 1.3~7.0.
8. The ratio of $T_3/T_5$ is suggested to be more than or equal to 0.75, and preferably between 0.75~2.5.
9. The ratio of $ALT/(AG_{12}+AG_{45})$ is suggested to be more than or equal to 9.0, and preferably between 9.0~25.0.
10. The ratio of $T_1/T_3$ is suggested to be less than or equal to 1.6, and preferably between 0.5~1.6.
11. The ratio of $T_1/AG_{34}$ is suggested to be more than or equal to 2.3, and preferably between 2.3~8.0.

12. The ratio of $T_3/T_6$ is suggested to be more than or equal to 0.8, and preferably between 0.8~2.0.

13. The ratio of $AAG/T_5$ is suggested to be less than or equal to 2.0, and preferably between 1.0~2.0.

14. The ratio of $T_1/AAG$ is suggested to be more than or equal to 0.65, and preferably between 0.65~1.2.

15. The ratio of $T_3/(AG_{12}+AG_{45})$ is suggested to be more than or equal to 1.3, and preferably between 1.3~5.0.

16. The ratio of $T_1/AG_{23}$ is suggested to be more than or equal to 2.0, and preferably between 2.0~5.0.

Figure 24:
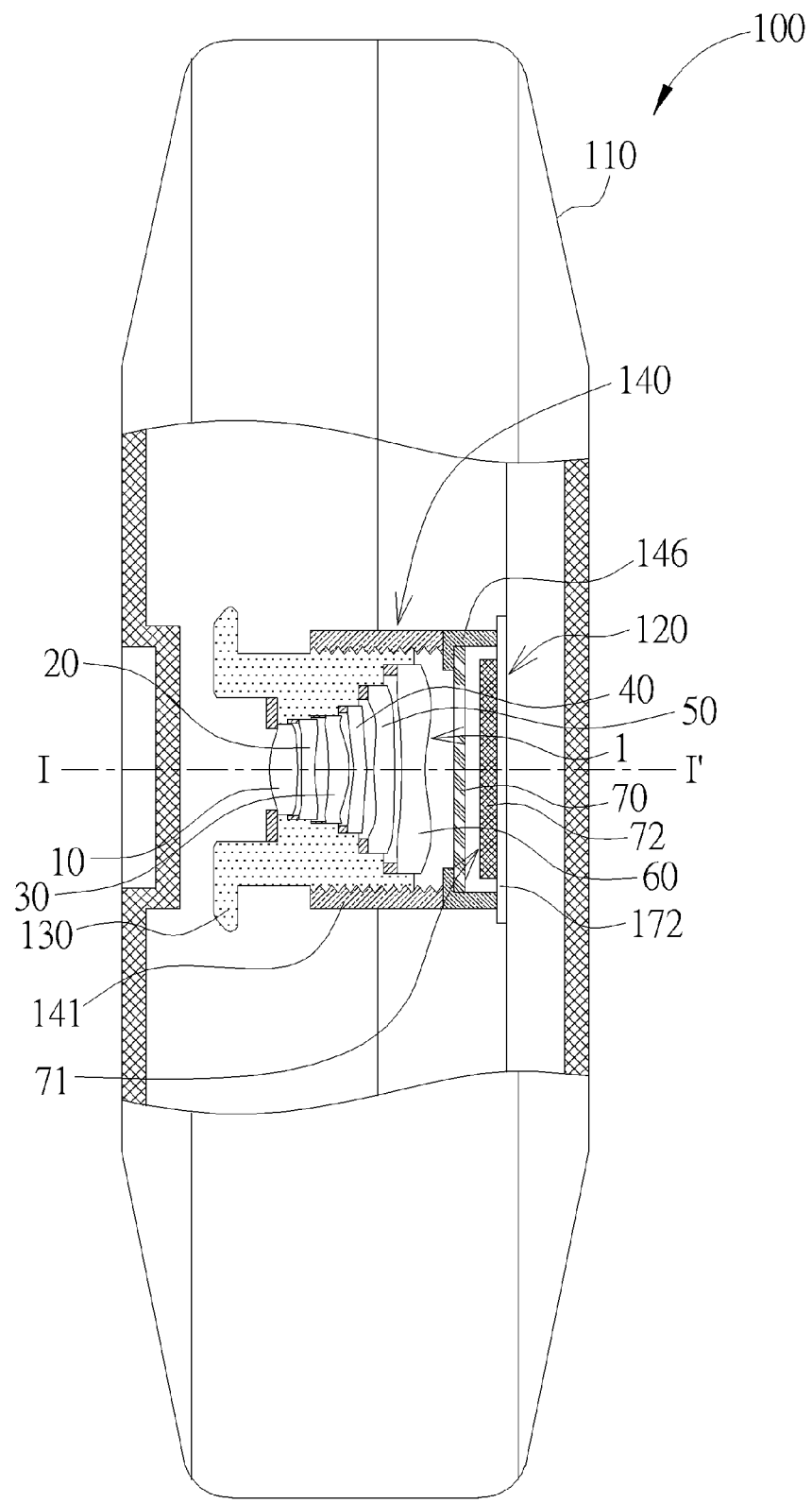
FIG. 24 illustrates a first preferred example of the portable electronic device with an optical imaging lens set of the present invention.

The optical imaging lens set 1 of the present invention may be applied to an electronic device, such as mobile phones or driving recorders. Please refer to FIG. 24. FIG. 24 illustrates a first preferred example of the optical imaging lens set 1 of the present invention for use in a portable electronic device 100. The electronic device 100 includes a case 110, and an image module 120 mounted in the case 110. A driving recorder is illustrated in FIG. 24 as an example, but the electronic device 100 is not limited to a driving recorder.

As shown in FIG. 24, the image module 120 includes the optical imaging lens set 1 as described above. FIG. 24 illustrates the aforementioned first example of the optical imaging lens set 1. In addition, the portable electronic device 100 also contains a barrel 130 for the installation of the optical imaging lens set 1, a module housing unit 140 for the installation of the barrel 130, a substrate 172 for the installation of the module housing unit 140 and an image sensor 72 disposed at the substrate 172, and at the image side 3 of the optical imaging lens set 1. The image sensor 72 in the optical imaging lens set 1 may be an electronic photosensitive element, such as a charge coupled device or a complementary metal oxide semiconductor element. The image plane 71 forms at the image sensor 72.

The image sensor 72 used here is a product of chip on board (COB) package rather than a product of the conventional chip scale package (CSP) so it is directly attached to the substrate 172, and protective glass is not needed in front of the image sensor 72 in the optical imaging lens set 1, but the present invention is not limited to this.

To be noticed in particular, the optional filter 70 may be omitted in other examples although the optional filter 70 is present in this example. The case 110, the barrel 130, and/or the module housing unit 140 may be a single element or consist of a plurality of elements, but the present invention is not limited to this.

Each one of the six lens elements 10, 20, 30, 40, 50 and 60 with refractive power is installed in the barrel 130 with air gaps disposed between two adjacent lens elements in an exemplary way. The module housing unit 140 has a lens element housing 141, and an image sensor housing 146 installed between the lens element housing 141 and the image sensor 72. However in other examples, the image sensor housing 146 is optional. The barrel 130 is installed coaxially along with the lens element housing 141 along the axis I-I', and the barrel 130 is provided inside of the lens element housing 141.

Figure 25:
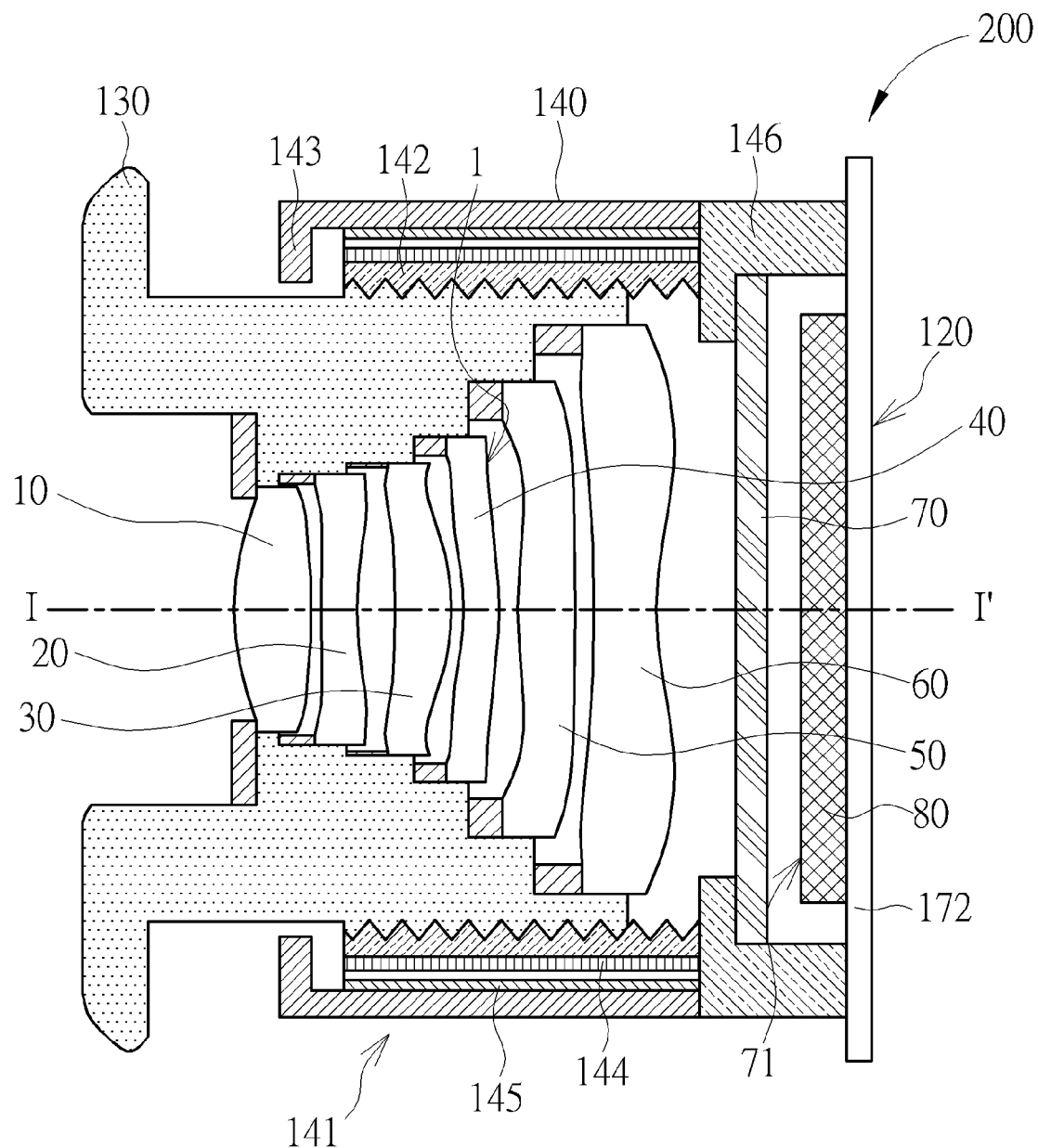
FIG. 25 illustrates a second preferred example of the portable electronic device with an optical imaging lens set of the present invention.

Please also refer to FIG. 25 for another application of the aforementioned optical imaging lens set 1 in a portable electronic device 200 in the second preferred example. The main differences between the portable electronic device 200 in the second preferred example and the portable electronic device 100 in the first preferred example are: the lens element housing 141 has a first seat element 142, a second seat element 143, a coil 144 and a magnetic component 145. The first seat element 142 is for the installation of the barrel 130, exteriorly attached to the barrel 130 and disposed along the axis I-I'. The second seat element 143 is disposed along the axis I-I' and surrounds the exterior of the first seat element 142. The coil 144 is provided between the outside of the first seat element 142 and the inside of the second seat element 143. The magnetic component 145 is disposed between the outside of the coil 144 and the inside of the second seat element 143.

The first seat element 142 may pull the barrel 130 and the optical imaging lens set 1 which is disposed inside of the barrel 130 to move along the axis I-I', namely the optical axis 4 in FIG. 6. The image sensor housing 146 is attached to the second seat element 143. The filter 70, such as an infrared filter, is installed at the image sensor housing 146. Other details of the portable electronic device 200 in the second preferred example are similar to those of the portable electronic device 100 in the first preferred example so they are not elaborated again.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical imaging lens set, from an object side toward an image side in order along an optical axis comprising: an aperture stop, a first lens element with positive refractive power, a second lens element with negative refractive power, a third lens element, a fourth lens element, a fifth lens element and a sixth lens element, said first lens element to said sixth lens element each having an object-side surface facing toward the object side as well as an image-side surface facing toward the image side, wherein:

said first lens element has positive refractive power, an object-side surface with a convex portion in a vicinity of said optical axis and a convex portion in a vicinity of its periphery, and an image-side surface with a convex portion in a vicinity of its periphery;

said second lens element has negative refractive power and an object-side surface with a concave portion in a vicinity of its periphery;

said third lens element has an image-side surface with a concave portion in a vicinity of its periphery;

said fourth lens element has an image-side surface with a convex portion in a vicinity of the optical axis;

said fifth lens element has an object-side surface with a concave portion in a vicinity of its periphery; and said sixth lens element has an image-side surface with a concave portion in a vicinity of the optical axis and a convex portion in a vicinity of its periphery, and the sum of all five air gaps AAG between each lens elements from said first lens element to said sixth lens element along the optical axis and a second lens element thickness $T_2$ satisfy $AAG/T_2 \le 3.6$.

2. The optical imaging lens set of claim 1, wherein a total thickness ALT of said first lens element, said second lens element, said third lens element, said fourth lens element, said fifth lens element and said sixth lens element along said optical axis and an air gap $AG_{23}$ between said second lens element and said third lens element along said optical axis satisfy a relationship $8.5 \le ALT/AG_{23}$.

3. The optical imaging lens set of claim 2, wherein a thickness $T_1$ of said first lens element along said optical axis and an air gap $AG_{34}$ between said third lens element and said fourth lens element along said optical axis satisfy a relationship $2.3 \le T_1/AG_{34}$.

4. The optical imaging lens set of claim 1, wherein a thickness $T_5$ of said fifth lens element along said optical axis, an air gap $AG_{12}$ between said first lens element and said second lens element along said optical axis and an air gap $AG_{45}$ between said fourth lens element and said fifth lens element along said optical axis satisfy a relationship $T_5/(AG_{12}+AG_{45})\leq 3.0$.

5. The optical imaging lens set of claim 4, wherein a thickness $T_3$ of said third lens element along said optical axis and a thickness $T_6$ of said sixth lens element along said optical axis satisfy a relationship $0.8\leq T_3/T_6$.

6. The optical imaging lens set of claim 4, satisfying a relationship $AAG/T_5\leq 2.0$.

7. The optical imaging lens set of claim 1, wherein an air gap $AG_{12}$ between said first lens element and said second lens element along said optical axis, an air gap $AG_{23}$ between said second lens element and said third lens element along said optical axis and an air gap $AG_{45}$ between said fourth lens element and said fifth lens element along said optical axis satisfy a relationship $0.7\leq (AG_{12}+AG_{45})/AG_{23}$.

8. The optical imaging lens set of claim 7, wherein a thickness $T_1$ of said first lens element along said optical axis satisfies a relationship $0.65\leq T_1/AAG$.

9. The optical imaging lens set of claim 1, wherein a total thickness ALT of said first lens element, said second lens element, said third lens element, said fourth lens element, said fifth lens element and said sixth lens element along said optical axis and an air gap $AG_{34}$ between said third lens element and said fourth lens element along said optical axis satisfy a relationship $9.0\leq ALT/AG_{34}$.

10. The optical imaging lens set of claim 9, wherein a thickness $T_3$ of said third lens element along said optical axis, an air gap $AG_{12}$ between said first lens element and said second lens element along said optical axis and an air gap $AG_{45}$ between said fourth lens element and said fifth lens element along said optical axis satisfy a relationship $1.3\leq T_3/(AG_{12}+AG_{45})$.

11. The optical imaging lens set of claim 1, wherein an air gap $AG_{12}$ between said first lens element and said second lens element along said optical axis, an air gap $AG_{34}$ between said third lens element and said fourth lens element along said optical axis and an air gap $AG_{45}$ between said fourth lens element and said fifth lens element along said optical axis satisfy a relationship $AG_{34}/(AG_{12}+AG_{45})\leq 1.5$.

12. The optical imaging lens set of claim 11, wherein a thickness $T_3$ of said third lens element along said optical axis and a thickness $T_5$ of said fifth lens element along said optical axis satisfy a relationship $0.75\leq T_3/T_5$.

13. The optical imaging lens set of claim 12, wherein a total thickness ALT of said first lens element, said second lens element, said third lens element, said fourth lens element, said fifth lens element and said sixth lens element along said optical axis, an air gap $AG_{12}$ between said first lens element and said second lens element along said optical axis and an air gap $AG_{45}$ between said fourth lens element and said fifth lens element along said optical axis satisfy a relationship $9.0\leq ALT/(AG_{12}+AG_{45})$.

14. The optical imaging lens set of claim 12, wherein a thickness $T_1$ of said first lens element along said optical axis satisfy a relationship $T_1/T_3\leq 1.6$.

15. The optical imaging lens set of claim 1, wherein a thickness $T_5$ of said fifth lens element along said optical axis and an air gap $AG_{34}$ between said third lens element and said fourth lens element along said optical axis satisfy a relationship $1.3\leq T_5/AG_{34}$.

16. The optical imaging lens set of claim 15, wherein a thickness $T_1$ of said first lens element along said optical axis and an air gap $AG_{23}$ between said second lens element and said third lens element along said optical axis satisfies a relationship $2.0\leq T_1/AG_{23}$.

17. The optical imaging lens set of claim 16, wherein a thickness $T_5$ of said fifth lens element along said optical axis, an air gap $AG_{12}$ between said first lens element and said second lens element along said optical axis and an air gap $AG_{45}$ between said fourth lens element and said fifth lens element along said optical axis satisfy a relationship $T_5/(AG_{12}+AG_{45})\leq 3.0$.

18. An electronic device, comprising:
  a case; and
  an image module disposed in said case and comprising:
    an optical imaging lens set of claim 1;
    a barrel for the installation of said optical imaging lens set;
    a module housing unit for the installation of said barrel;
    a substrate for the installation of said module housing unit; and
    an image sensor disposed at an image side of said optical imaging lens set.

* * * * *